United States Patent [19]
Brooks et al.

[11] Patent Number: 5,826,166
[45] Date of Patent: Oct. 20, 1998

[54] DIGITAL ENTERTAINMENT TERMINAL PROVIDING DYNAMIC EXECUTION IN VIDEO DIAL TONE NETWORKS

[75] Inventors: Kenneth R. Brooks, Middletown; Ulric E. Arthur, Burtonsville, both of Md.

[73] Assignee: Bell Atlantic Network Services, Inc., Arlington, Va.

[21] Appl. No.: 499,013

[22] Filed: Jul. 6, 1995

[51] Int. Cl.⁶ .................................................. H04N 7/173
[52] U.S. Cl. .............................. 455/5.1; 455/6.2; 348/10; 348/12
[58] Field of Search ..................................... 348/12, 13, 7, 348/6, 10, 11; 455/3.1, 4.2, 5.1, 6.1; 370/60.1, 85.7, 68.1; H04N 7/16, 7/173

[56] References Cited

U.S. PATENT DOCUMENTS

| | | |
|---|---|---|
| 4,623,920 | 11/1986 | Dufresne et al. . |
| 4,982,430 | 1/1991 | Frezza et al. ............................. 348/13 |
| 5,003,591 | 3/1991 | Kauffman et al. ......................... 348/7 |
| 5,247,347 | 9/1993 | Litteral et al. . |
| 5,357,276 | 10/1994 | Banker et al. .......................... 455/4.2 |
| 5,410,343 | 4/1995 | Coddington et al. .................... 348/14 |
| 5,440,632 | 8/1995 | Bacon et al. ............................ 380/20 |
| 5,473,679 | 12/1995 | La Porta et al. ........................ 348/12 |
| 5,513,180 | 4/1996 | Miyake et al. ............................. 348/7 |
| 5,583,563 | 12/1996 | Wanderscheid et al. ................ 348/10 |
| 5,635,979 | 6/1997 | Kostreski et al. ....................... 348/12 |

*Primary Examiner*—Chris Grant
*Attorney, Agent, or Firm*—McDermott, Will & Emery

[57] ABSTRACT

Apparatus and method for selectively executing a resident terminal application and an information provider-specific application stored in a digital entertainment terminal adapted to decode broadband data signals from a video dial tone network. The digital entertainment terminal stores the resident terminal application related to native operations including network communications in a nonvolatile memory, and stores the information provider-specific applications used for accessing the information provider's services in a dynamic memory. The digital entertainment terminal is adapted to suspend execution of one of the resident application and the information provider-specific application and begin execution of the other application in response to a toggle input from a user's remote control, and resume execution of the suspended application in response to a second toggle input from the user's remote control. Decoding of received broadband signals from the video dial tone network is based upon stored connection block descriptors, and is thus independent of the suspension of one of the applications. Thus, a user may pause an interactive session to scan broadcast channels, or to initiate a second interactive session.

29 Claims, 7 Drawing Sheets

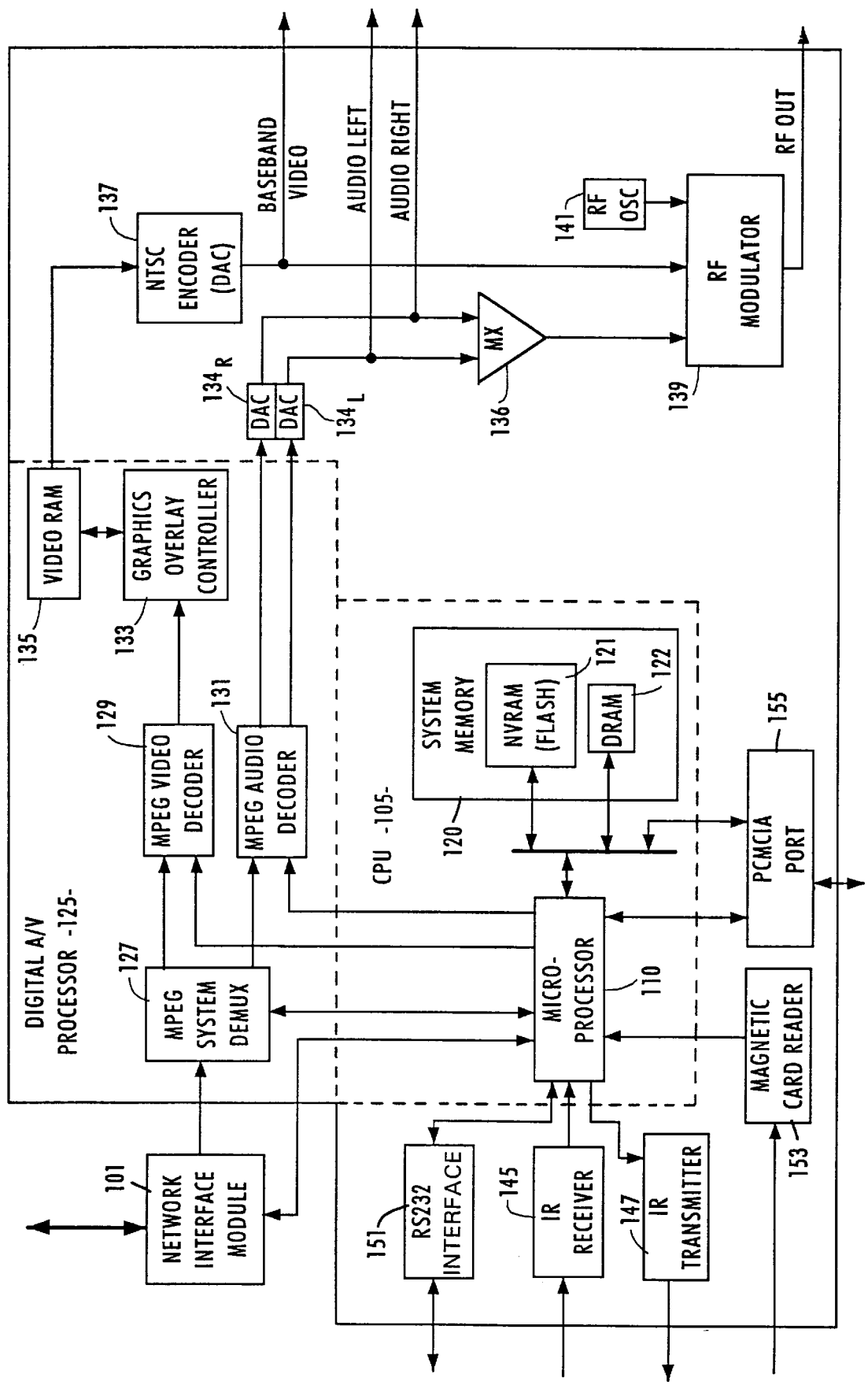

DIGITAL ENTERTAINMENT TERMINAL PROVIDING DYNAMIC EXECUTION IN VIDEO DIAL TONE NETWORKS

BACKGROUND OF THE INVENTION

1. Field of the Invention

The present invention relates to a programmable digital entertainment terminal (DET) for use in digital video program distribution networks providing dynamic programming of such a terminal to offer a variety of broadcast and interactive services.

2. Description of the Related Art

Set top terminal devices are interface devices used to process broadband signals received at a customer premises before being supplied to a user's television set for viewing. Such set top terminal devices are commonly supplied by cable television companies to their subscribers and are used to receive the RF signals from the cable television distribution systems.

Despite their popularity in the cable television industry, these cable television terminal devices have a number of limitations. For example, the cable television terminal devices are limited to processing of analog television signals. In addition, cable television terminal devices are generally "dumb" devices having a limited set of functionalities constrained by the hard wired programming of the internal micro-processor controlled device. Essentially all cable television terminal devices respond to a selection input from the subscriber, tune to a selected channel available on the cable television network, decode the video program material if scrambled, and provide output signals compatible with a standard television receiver.

Enhanced cable television terminals do provide some additional features, such as graphics overlay capability and two way communication of control signaling to and from headend terminal devices. Although such improved terminals facilitate some enhanced services, such as home shopping and purchasing, the performance of these cable television set top terminals is still limited to analog decoding. Further, the range of services remains limited by the hard wired capabilities of the microprocessor within the set-top terminal devices.

Proposals have been made to download computer executable code over cable television networks. In particular, U.S. Pat. Nos. 5,051,822 and 5,181,107 both to Rhoades disclose a terminal device connectable to a cable television network and a telephone line. A subscriber requests a video game or other software stored in a remotely located software storage center by operating the terminal to establish a bi-directional telephone link with the remote storage center. The center transmits the encoded software program together with the terminal identification code as a digital bit stream over a television broadcast channel. The terminal requesting the software monitors all digital bit streams on the broadcast channel but receives only the software program addressed to it, i.e. only after identification code validation occurs. One reception of all the software data is complete, the terminal acknowledges receipt to the remote storage center and drops the telephone line. The encoded software program is decoded, and the terminal provides a display informing the subscriber that the game or other program is ready for use. The terminal also offers the subscriber the means to interact with the software, e.g. play the game, using contemporary gaming control or input devices.

While the Rhoades terminal structure does provide enhanced capabilities, such as video games and home shopping, the display functionality controlled by the downloaded software is limited to computer displays generated in response to the software. Hence, there is no direct interaction of the received software with any video program carried on the cable network, nor does the downloaded software control any further instructions with the storage center. Since the video transmissions on the cable system are analog, a separate telephone connection is required for selection inputs to the central storage facility. Furthermore, the terminal device apparently can receive software from the storage center of only one service provider.

While some prior art systems permit downloading into the cable television decoder itself, this downloading of information into the decoder has apparently been limited to information controlling the decoding of the television program signals, e.g. a key word used in a descrambling algorithm. For example, Dufresne et al., in U.S. Pat. No. 4,623,920 teach a specific scheme for addressing data transmissions over a cable television network to groups of terminals or to individual terminals. The addressed data sent from the head end can include an option table of signals for controlling descrambling of available television programs, data to enable operation of a cable TV converter, or software for operating a peripheral microcomputer separate from the cable television terminal device. The Dufresne et al. terminal is limited to reception of data from only one service provider, i.e. the provider operating the cable TV network. Also, the services provided through the terminal are limited in that the downloaded data apparently does not alter or control the terminal functionality for further interactions with the provider through the network.

Recently, several different wideband digital distribution networks have been proposed for offering subscribers an array of video services, such as Video On Demand. These services, also referred to as video dial tone services, are designed to enable users to select desired programs from multiple video information providers (VIPs). The following U.S. Patents disclose representative examples of such digital video distributions networks: U.S. Pat. Nos. 5,253,275 to Yurt et al., 5,132,992 to Yurt et al., 5,133,079 to Ballantyne et al., 5,130,792 to Tindell et al., 5,057,932 to Lang, 4,963, 995 to Lang, 4,949,187 to Cohen, 5,027,400 to Baji et al., and 4,506,387 to Walter. The terminal devices in these digital networks are still limited functionality devices. In these networks, the digital terminal devices still only receive selection inputs, transmit selection signals upstream to the source of the video materials, receive downstream video transmissions, decompress the digitized video materials and convert to analog form, and provide appropriate signals to a television receiver.

One such digital video distribution network and the terminal device for such a network, is disclosed in Litteral et al. U.S. Pat. No. 5,247,347, the disclosure of which is hereby incorporated in its entirety into this disclosure by reference. Litteral et al. discloses an enhanced public switched telephone network which also provides a video on demand service to subscribers over the Public switched telephone-network. A menu of video programming information is displayed at the subscriber's premises by a set-top terminal and a TV set. The subscriber may transmit ordering information via the Public switched telephone network to the independent video information providers. Video programming may be accessed and transmitted to the subscriber directly from a video information provider (VIP) or through a video buffer located at a central office (CO) serving the subscriber.

The above detailed discussion of the Litteral et al. system shows that prior art digital distribution networks offer enhanced video services, but the terminal device functionality is still limited to program selection, decoding and display. Also, the interactive services provided require a full wideband channel to each DET, dedicated entirely to that DET, for the entire session.

A number of suggestions have been made in the press regarding arrays of different services which will become available through broadband digital networks now popularly referred to as the "Information Super Highway". If a different VIP were to offer a different service, the VIP can limit the service to an interactivity with the subscriber essentially corresponding to the functionality available in the terminal device. This approach, however, limits the functional capabilities the new VIP may choose for the different service. Alternatively, the subscriber must buy another terminal device programmed or wired to function in accord with the VIP's new service. This second approach, however, forces the subscriber to purchase and connect a different terminal device for each subscribed service.

An additional problem of the known terminal devices is that the terminal device is limited in compatibility to the functions specified by the information provider during hardwiring of the terminal device. Moreover, the conventional terminal devices are dedicated in functionality to support the interactive session until the session is terminated by the user or the information provider. Since the interactive session typically requires a large amount of bandwidth to download interactive video data, the interactive session will usually occupy the entire downstream bandwidth allotted to a user, thereby preventing the user from accessing other video dial tone services during the interactive session. Thus, the user is "locked into" the interactive session and unable to access other video dial tone services. This problem may be a substantial annoyance to users when the interactive sessions are extremely lengthy.

Disclosure of the Invention

A need exists in the art for set-top terminal devices that process compressed, broadband digital audio video information and that are readily adaptable to perform a variety of related functionalities as needed to facilitate a range of audio/video and interactive services offered by a large number of information providers.

A need also exists to provide digital video terminal devices that enable different video information providers to present their respective video services in an organized, structured format adapted for ease of use by the user.

Some video information providers have offered navigation, or "guide" programs to enable users to access the VIP's services. Some users, however, desire the flexibility to perform set top management functions independent of the navigation programs. Thus, a need exists to provide digital video terminal devices that enable video information uses to independently control the execution of navigation software.

A need also exists to provide digital video terminal devices that provide sufficient user control to selectively execute video dial tone functions and interactive software programs provided by information providers.

A need also exists to provide digital video terminal devices that enable a user to perform separate and independent digital video terminal functions during an interactive session, such as terminal management functions, video dial tone gateway functions, broadcast reception, or concurrent execution of multiple interactive sessions.

The present invention provides methods and terminal device structures for dynamically programming a digital audio/video entertainment terminal. The terminal can be reprogrammed on an as-needed basis to provide a wide range of services and associated terminal functionalities.

The present invention provides a digital entertainment terminal in communication with a network interface module that establishes two-way control signaling communication between the terminal and a communication network and receives digital broadband information. The digital entertainment terminal also includes a control processor and memory for storing control functions and information downloaded from the communication network.

The digital entertainment terminal is adapted to be dynamically programmed by a digital communication link established between the digital entertainment terminal and either the digital broadband network or one of the video information providers. The terminal receives software executable by the control processor from the network via the digital communication link, which may be established by a downstream, broadband channel or an out of band signaling channel. The received software is stored in a memory within the digital entertainment terminal.

The software downloaded and stored in the terminal memory may include an updated operating system software or a resident application software used by the terminal to enable two-way communications with the broadband network. The downloaded software may also include a navigation program for providing the user access to broadcast or interactive services from an available information service provider. Applications programs can take an almost infinite variety of forms to facilitate different services. For example, the applications programs can control the formatting of different types of graphic displays overlaid on video programming for different services and can specify different definitions for input keypad functions. The applications programs can specify security procedures and/or enable operation of associated peripheral devices such as credit card readers.

According to the present invention, the digital entertainment terminal is controlled by user inputs to selectively execute the different software applications stored in memory. Thus, the digital entertainment terminal enables a user to suspend execution of an application program downloaded from one information provider in order to perform other terminal functions, such as scan broadcast channels for other network services, run a second application program, or modify customer account profiles via an interactive session with the account manager of the broadband data network. Upon the completion of the other terminal functions, the user is able to resume the suspended application program.

Thus, in the case of interactive applications, a user is able to suspend an interactive session and perform other terminal functions, including initiating another interactive session with another provider, without terminating the first interactive session. Hence, the digital entertainment terminal of the present invention provides maximum flexibility to give users full control over the execution of video dial tone functions.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIG. 1 is a block diagram of a digital entertainment terminal according to the present invention.

BEST MODE FOR CARRYING OUT THE INVENTION

Figure 2A:
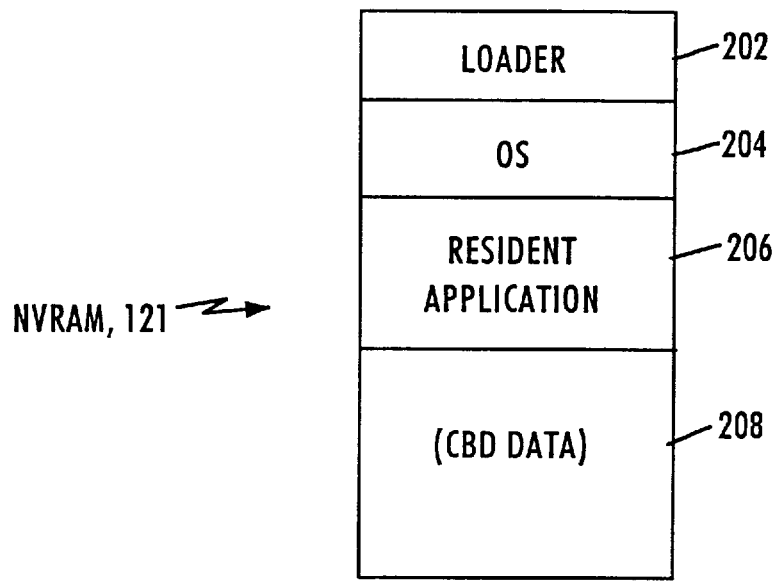
FIGS. 2a and 2b show a system memory layout for the digital entertainment terminal of FIG. 1.

The digital entertainment terminal (DET) of the present invention is useable in a variety of different broadband distribution networks which offer subscriber's selective communication with a plurality of broadband or video information service providers. According to the present invention, the digital entertainment terminal is adapted to receive and store downloaded software via a level 1 gateway session or via a point to point link to a VIP's interactive equipment. Alternatively, the DET may receive and store such software carried on one of the broadcast channels of the broadband network. The DET stores the downloaded software in memory segments, and selectively executes or suspends execution of the downloaded software without any interruption of bandwidth allocation to the user's DET by the network. As a result, interactive sessions and the like can be suspended without interrupting the broadband data link.

FIG. 1 is a block diagram of a digital entertainment terminal according to the preferred embodiment of the present invention. The DET 100 shown in FIG. 1 will connect to a number of different types of networks and different network architectures, such as a fiber to the home, fiber to the curb, and hybrid fiber coax. Examples of the different types of available networks are disclosed in commonly assigned application Ser. No. 08/250,792, filed May 27, 1994, entitled "Full Service Network" (attorney docket no. 680-080), and in commonly assigned application Ser. No. 08/413,810, filed Mar. 28, 1995 entitled "Access Subnetwork Controller for Video Dial Tone Networks" (attorney docket no. 680-093B), the disclosures of which are incorporated herein in their entirety by reference.

In each network embodiment, the digital entertainment terminal (DET) of the present invention will include decoding circuitry for receiving and converting compressed, digitized audio/video signals into analog signals capable of driving conventional audio/video output devices, typically a standard television receiver. Although other decoders may be used, such as a DIGICIPHER™ decoder, the preferred embodiments of the DET will receive and process MPEG encoded information.

MPEG (moving picture experts group) is a broad generic standard for digital video program compression. A number of specific compression algorithms will satisfy MPEG requirements. MPEG-2 is a second generation compression standard capable of encoding video program material into a 6 Mbits/sec bit stream and packetizing a number of 6 Mbits/sec channel streams into a single higher rate signal transport stream. MPEG is a bi-directional predictive coding compression system, coded in accordance with discrete cosine transformation (DCT) processing. Picture elements are converted from spacial information into frequency domain information to be processed. Compression is begun by discarding information to which eyes are insensitive.

From the remaining information, an actual video reference frame, or I frame, is periodically used. The number of frames to be coded for each such I frame is set in the MPEG syntax, e.g., one reference frame for each fifteen frames, or every half second. A prediction is made of the composition of a video frame, termed a P frame, to be located a specific number of frames forward and before the next reference frame, the specific number also set in the MPEG syntax. Information from previous frames as well as later frames is used in formulating the prediction. "Delta" information is developed for coding the frames, called B frames, between the actual and predicted frames, also by looking at frames in both directions. Rather than updating a whole frame, only the changed (or delta) information is provided for the delta frames. Thus the total information coded, and then transmitted, is considerably less than required to supply the actual information in the total number of frames. Typically, between I frames is a succession of two B frames followed by one P frame.

On decompression, the decoder in sequence uses the reference frame to form the prediction frames, these frames being used to construct the delta frames. Data is thus decoded in an order different from the order in which frames are viewed. Decoding must be several frames ahead of the frame currently shown on video.

The MPEG-2 standard also provides a standardized format for packetizing the compressed audio and video information and for transporting other data. Under the MPEG-2 standard, incoming individual video signals and related audio signals are encoded and packetized into respective Video and Audio Packetized Elementary Streams (PES). The video and audio PES's from one or more sources of video programming may be combined into a transport stream for transmission or storage PES packets made up of elementary streams that form a program share a common time base. The transport stream is designed for use in environments where errors are likely, such as storage or transmission via a noisy media. Transport stream packets are 188 bytes in length. Transport stream packets generally consist of two sections, a header section and a payload section. The header information includes, inter alia, a synchronization byte, transport scrambling control and a thirteen bit program identification (PID) number. PID value 0 is reserved as an indication that the packet includes program association table data. PID value 1 is reserved for identification of packets containing conditional access data, such as encryption information. PID value 0×1FFF is reserved for null packets utilized for synchronizing the link. The other program identification numbers are utilized to identify transport packets with the program source from which they originate.

Within a transport stream, a program association table (packet PID 0) maps each program source with the PID value associated with a program map table (PMT) related to that source. Thus, the program association table defines the packet location in the transport stream of a program map table for each source of programming in the transport stream. The program map, in turn, specifies the PID values for packets containing video, audio and/or data from the particular source. For example, the program map for CBS might be found in packets corresponding to PID 132; the program map for NBC might be found in packets identified by PID 87 and so forth. The program map for CBS in the packet with PID 132 would then identify the PID numbers for the actual packetized elementary streams (PES) for the video and audio channels associated with the CBS program.

One should note at this time that more than two PID's may be associated with programming from one source. For example, there could be a data channel associated with the program which would include data for closed captioning for the hearing impaired. There could be a number of audio elementary streams, for example, carrying respective different languages. Thus the programming map provides some flexibility beyond that required for merely associating a single video and audio elementary stream.

Once the DET identifies and captures the program map table, the program decoder can extract the video elementary stream, the audio elementary stream(s) and any associated data stream for decoding of the programming. In accord with the present invention certain data streams transported through the video dial tone network contain software for storage and execution by the DET, as discussed in more detail later.

Within an identified video elementary stream, video sequence headers define items such as frame rate, resolution, and the coordinates on a screen where display of the image should begin. Such coordinates are useful, for example, in defining pictures within a picture when multiple pictures are superimposed. In each video stream packet, after the video header sequence, the packet contains the actual video syntax which, in the case of MPEG, includes the normal frames associated with video compression, such as I frames and B frames, etc., in MPEG.

For each different type of network, the DET 100 (FIG. 1) will be coupled to a network interface module 101 providing the actual physical connection to the particular type of network. The network interface module 101 will also perform any format conversion necessary between signal formats utilized by the network and signal formats used within the DET 100. For example, in the Full Service Network disclosed in the cited 08/250,792 application, the network interface module 101 will include means to demodulate received broadband data and convert ATM (Asynchronous Transport Mode) cell stream data into MPEG bit stream data for further processing. The network interface module 101 also provides two-way signal conversion and formatting for at least a control signaling channel. The network interface module 101 also temporarily stores data transmitted from the network during times when the DET 100 is in a standby state (i.e., supplied power, but CPU is in an off state).

In the illustrated embodiment, the network interface module 101 presents two connections to the rest of the DET, a high bit rate broadband connection and a low bit rate signaling connection. The broadband connection is a one-way downstream only connection, but the low-bit rate signaling connection is a two-way connection. For example, the network interface module would include means to multiplex and demultiplex signals for transmission/reception over a coaxial cable or optical fiber. The network interface module would also include the means to physically connect to the particular network. For example, in a fiber to the home network, the module would include a means for two-way conversion between electrical and optical signals and connections to one or more optical fibers for the necessary two-way transmission. However, the network interface module might be modified for a non-physical communication link, for example, via digital wireless or satellite-to-antenna, especially in rural areas.

The network interface module 101 takes the form of a plug in module. In one embodiment, the module 101 would be similar to a daughter board or option card which can be plugged into a back plane of a personal computer (PC). In such an embodiment, typically a technician could replace the module in either the field or the shop, to modify a DET to connect to and communicate over a different network, and the technician would modify associated communications control software in the system memory. Alternative implementations may use a user replaceable cartridge type network interface module, similar to a video game cartridge, which may include memory in the module for storage of the communications control. As a further alternative, the network interface module could include a digital signal processor controlled by the CPU of the DET and input/output connections compatible with all of the digital broadband networks currently available. The downloaded operating system software stored in the system memory of the DET would control operations of the digital signal processor to send and receive signals in accord with the particular network the subscriber chooses to connect the DET to.

The DET 100 includes a CPU 105, comprising a 386 or 486, Pentium or Motorola 6800 series microprocessor 110 and associated system memory 120. The system memory 120 includes at least 2 Mbytes of volatile dynamic RAM (DRAM) 122 and 1 Mbyte of non-volatile RAM (NVRAM) 121. The microprocessor 110 includes a small amount of ROM (not shown) storing "loader" programming needed to control wake-up. An EPROM memory (not shown) also may be added.

A digital audio/video signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames (e.g. 8 mbytes) of video RAM 135.

The MPEG system demultiplexer circuitry 127 recognizes packets in the MPEG data stream received over the broadband channel through the network interface module 101 and routes the packets to the appropriate components of the DET. For example, the MPEG system demultiplexer 127 circuitry recognizes audio and video packets in the MPEG data stream and routes payload data from those packets to the decoders 129, 131, respectively.

The MPEG video decoder 129 decompresses received video signals to produce a digital video signal, and the MPEG audio decoder 131 decompresses received audio signals to produce left and right digitized stereo signals. For at least some functions, the MPEG decoders 129, 131 may be controlled in response to signals from the microprocessor 110. The MPEG video decoder 129 will internally include at least two frames (e.g. 8 mbytes) of RAM (not separately shown) for use as a frame reorder buffer during the MPEG video decoding process, and the MPEG audio decoder 131 also may include some buffer memory.

The video RAM 135 is not a specialized "video RAM" as that term is sometimes used in the television art. The RAM 135 is actually a standard digital data RAM, of appropriate size, which is used in the DET to store digitized frames of video data. The RAM within the MPEG video decoder 129 likewise consists of standard digital data RAM.

The graphics display generator produces displays of text and graphics data, such as the initial turn-on selection menu received over the signaling channel, in response to instructions from the CPU 105. The video RAM 135 sequentially receives each frame of digitized, uncompressed video information, as output from the MPEG video decoder 129. The video RAM 135 also receives digital information and read/write control signals from the graphics overlay controller 133 representing the several planes of text and graphics information and combines that information with the frames of decompressed video to produce composite video frames.

The graphics overlay controller 133 and the video RAM 135 actually cooperate to manipulate five different planes of video information, four of which can be active at any one time, to produce the composite video frame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overly controller 133. In this last situation, the graphics overlay controller would deactivate the backdrop plane.

Under certain circumstances, the video RAM 135 also serves to freeze video frames. For example, when a video transmission ends for some reason, the RAM 135 will contain the video and associated graphics information for the frame last received and displayed. The DET can continue to output this frame as a still video output signal for some period of time.

The DET also includes audio and video digital to analog converters and appropriate drivers to produce output signals compatible with a conventional television set. Specifically, the converter and driver circuitry of the DET 100 includes audio digital to analog converters (DAC's) $134_L$, $134_R$, an audio mixer 136, an NTSC encoder 137, and an RF modulator 139.

The DAC's $134_L$ and $134_R$ receive the uncompressed left and right digitized audio signals output by the MPEG audio decoder 131. In response, the DAC's $134_L$ and $134_R$ produce baseband analog audio signals for output to individual baseband output terminals. The audio mixer 136 also receives the baseband audio signals from the DAC's $134_L$ and $134_R$. The mixer 136 combines the left and right analog audio signals to produce a monaural audio signal as the audio input to modulator 139.

The NTSC encoder 137 also performs a digital to analog converter (DAC) function. In response to the digitized video output signals from the video RAM 135, the NTSC encoder 137 produces a baseband analog video signal in standard NTSC format. The baseband NTSC video signal is supplied to an output terminal of the DET 100. The baseband NTSC video signal is also supplied to the RF modulator 139. The RF modulator 139 responds to the mono audio signal, the NTSC video signal and an RF signal from a local RF oscillator 141, to produce a standard RF television signal on an available TV channel, typically channel 3 or channel 4.

The type of connection of the DET 100 to the television set depends on the capabilities of the user's television set. If the user has a monitor type television capable of receiving baseband video and stereo audio inputs, the appropriate terminals of the television would connect directly to the video and audio output terminals of the DET 100. If the subscriber does not have such a television monitor, then the RF output of the modulator 139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET also includes means to receive selection signals from a user, and under at least some circumstances, transmit appropriate data signals over a narrowband channel through the particular video network. For example, the DET 100 may send and receive control data through a 16 kbit/s channel on the subscriber's loop of a Video Dial Tone network, whereby the network includes an X.25 type packet network for transport of the control signaling data. As shown in detail below, however, the preferred network transports upstream signaling data to a video node hub which routes the upstream signaling data in an ATM backbone subnetwork.

In the embodiment illustrated in FIG. 1, the DET 100 includes an infrared (IR) receiver 145. The (IR) receiver 145 responds to inputs signals from a user operated IR remote control device (see FIG. 7) similar to that used today for controlling televisions and video cassette recorders. In response to the IR signals, the receiver 145 produces corresponding digital data output signals. The microprocessor 110 interprets the digital data signals by the IR receiver 145 as input commands. The precise interpretation of specific command signals can vary based on the downloaded applications programming and/or operating system software stored in the system memory 120. In response to the input commands, the microprocessor 110 controls cursor position and alphanumeric information displayed as graphics and text on the associated television set. The microprocessor 110 will also respond to an appropriate input command from the user to formulate a message for upstream transmission though the network interface module 101 and the signaling channel of the particular connected network.

The DET of the present invention is an open interface device in that it interacts with equipment of a large number of service providers (often referred to as "VIPs") to offer users a wide array of video and interactive multi-media services. The digital entertainment terminal (DET) is a programmable device to which different individual video information providers (VIP's) can download applications software, and at least one VIP (the VIP selling the DET) can download the resident application together with all or a part of the operating system.

The DET 100 of the present invention may also include a number of additional interface devices. In the example illustrated in FIG. 1, the DET 100 includes an IR transmitter 147. The transmitter 147 responds to digital data signals from the microprocessor 110 and outputs corresponding IR signals for wireless transmission. The IR transmitter 147 and IR receiver 145 may operate together to provide a two-way wireless data communication link to some remote device, such as a personal data assistant (PDA) or pocket organizer. Alternatively, the IR transmitter may send signals to a remote display device for use in a service not requiring the TV set. For example, in an audio on demand service, the IR transmitter would send display data to an LCD display located near the user's stereo system.

The illustrated DET also includes an RS-232 transceiver 151 connected to the microprocessor 110. An RS-232 port is a standardized two-way serial data interface typically used for connecting computers to peripheral devices, such as modems. In the present system, the RS-232 transceiver 151 might provide a serial data connection to an external personal computer (PC), such that the DET permits communications between the PC and the Video Dial Tone network. Alternatively, this port might connect the DET to a printer, e.g. to print coupons during home shopping/browsing services. A hand-held diagnostic terminal would also connect to this port during servicing of the DET. The communications and protocols offered by the DET through the transceiver 151 would be controlled by the operating system and applications program software downloaded into the system memory 120.

FIG. 1 also shows the DET 100 including a magnetic card reader 153 connected to the microprocessor 110. This reader 153 could be used to scan credit card information encoded on magnetic strips on commonly available credit cards. In a home shopping and purchasing service, controlled by the downloaded software, the user would scan their own credit card through the magnetic card reader 153 as part of the payment operations. The reader could also have magnetic write capabilities to perform debit card operations.

The illustrated DET 100 further includes a personal computer memory-card interface adapter (PCMCIA) port 155. This is a two-way interface for connection to and communication with a flash memory module, such as is now incorporated into advanced "smart card" devices. In a medical service, a user might communicate with a medical information database through the DET 100 and the broadband network. The user's personal medical history information could be read from the smart card and subsequently updated on the smart card, through the PCMCIA port 155. Another use of this port might involve communication to a connected video game system to download video game software to the video game system and/or play interactive video games. Although specified as a "memory" port and mapped by the CPU as part of its system memory space, the devices connected to this port 155 can have other data processing capabilities, e.g. buffering and modem communication capability.

In the current implementation, the PCMCIA port 155 will carry 6 Mbits/s of data, but the port can be designed for higher speeds such as 20 Mbytes/s. Another use of this port would be for connection to an Ethernet card or other Local Area Network (LAN) card to permit data communications between the DET and one or more computers. The DET would provide the computers with communications services through the broadband network, for example to receive high speed downloads of new or updated software for those computers. Although similar functions are possible through the RS-232 transceiver 151, the data rate through the PCMCIA port 155 is much higher.

Figure 2B:
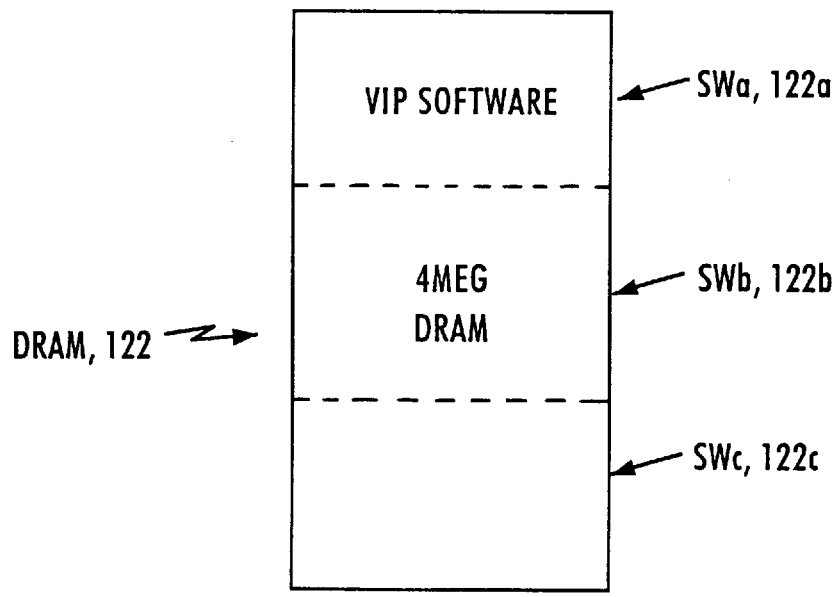

FIG. 2 shows two separately mapped segments of the system memory 120 of FIG. 1. As shown in FIG. 2, the system memory 120 includes nonvolatile (NVRAM) memory 121 and a dynamic memory (DRAM) 122. The non-volatile memory 121 preferably includes a read-only memory (ROM) within the microprocessor (typically 128 kbytes) and a non-volatile RAM (minimum 512 kbytes to 1 Mbyte). Alternatively, the entire non-volatile memory portion 121 may consist of 1 Mbyte of flash memory. The dynamic memory 122 preferably comprises 4 Mbytes of DRAM.

The non-volatile memory 121 will store a loader program 202, an operating system 204, a resident application 206, and any necessary communication data 208, such as connection block descriptors for default broadband and signaling channels and authorized services. The loader program 202 controls many of the wake up functions of the CPU 105. The loader program 202 is analogous to a BIOS (basic input/output system) in a PC. The loader program 202 provides initial instructions to the microprocessor 110 to carry out a series of hardware diagnostics during an initial boot routine. If faults are detected, the loader program 202 will cause display of error codes and instructions on the associated television screen. For example, if the loader program 202 results in detection of a network error, the DET might generate a display instructing the subscriber to call a telephone number assigned to the network service company together with a four digit code indicating the type of network fault, e.g. lack of a signaling channel or lack of a broadband channel. Alternatively, if faults in the DET are detected, the display would instruct the subscriber to call a telephone number assigned to the DET vendor together with a four digit code indicating the type of DET equipment fault, e.g. operating system memory error.

The operating system (OS) 204 provides sufficient programming to support multi-tasking operations, control initial communications, maintain diagnostic routines, and define interfaces and I/O drivers. An exemplary operating system is OS-9. The resident application 206 provides sufficient programming to permit signaling communications through the particular type of network interface module and network the DET connects to. The OS 204 and the resident application 206 may be preinstalled into the DET 100 by a specific VIP that sells or leases the DET to a customer for use within a predetermined network. In such a case, the memory 208 would include predetermined connection block descriptors used to identify predetermined control channels that cyclically transmit software to be downloaded by the DET, such as channel map information including updated connection block descriptors, or updated versions of the OS 204 or the resident application 206. More preferably, however, at least portions of the OS and the resident application 206 are downloaded from the network upon activation of the DET 100 by a technician or by the user. If the DET 100 is activated by a technician, the DET 100 may receive connection block descriptors from a technician's service card via the PCMCIA port 155 in order to download software that is cyclically transmitted by the network on a broadcast control channel. Alternatively, the technician may use his or her service card to temporarily supply via the PCMCIA port 155 with any software necessary, including information to establish upstream and downstream signaling channels, to enable the DET 100 to conduct a level 1 gateway session with the network. The level 1 gateway session may be used to activate the DET 100 on the network and to download the necessary OS and resident application.

If the DET 100 is activated by the user, the memory 208 would store predetermined connection block descriptors for predetermined downstream and upstream signaling channels to be used by unregistered users to download via a control channel programming to conduct minimal communication with the network, such as a level 1 gateway session to register the video information user (VIU). Upon completion of registration, the network would download during the level 1 gateway session connection block descriptors that identify the default downstream and upstream signaling channels for the registered user. Once the user receives default downstream and upstream signaling channels, the DET 100 is able to download the OS and resident application for storage in the nonvolatile memory 121. Additional details regarding the downloading of the resident application 206 and the connection block descriptors are discussed in detail below, and are also found in commonly assigned copending application U.S. Ser. No. 08/380,755, filed Jan. 31, 1995, (attorney docket no. 680-083C) and U.S. Ser. No. 08/413,810, filed Mar. 28, 1995 (attorney docket no. 680-093B), the disclosures of which are incorporated in their entirety by reference.

The DRAM 122 is designed to store software that is downloaded through the network in order to provide VIP specific services. Thus, the DRAM 122 is designed to store application software such as navigation software, or interactive programs for driving IMTV sessions with an IMTV VIP via its level 2 gateway. If desired, the DRAM memory 122 may be partitioned into regions 122a, 122b and 122c in order to store different software applications $SW_a$, $SW_b$, and $SW_c$, respectively. While the DRAM 122 may be used to temporarily store downloaded software for the OS 204 or the resident software 206 before being loaded into the NVRAM 121, the DRAM 122 is typically used to store executable data downloaded from a VIP. The executable data may comprise an interactive game, a navigation menu for ordering pay-per-view broadcast services or other services, or data in the form of a channel map consisting of logical channel numbers and corresponding connection block descriptors to enable a user to "channel surf".

Navigation software, when loaded by the DET, may also be implemented as a menu program operating as an electronic TV Guide that is recalled each time the user presses a predetermined button, for example "GUIDE", on the remote control. In this example, the first time a user presses the "GUIDE" button on a remote control after turning on the DET, the DET jumps to a control channel broadcasting the navigation software for the network or for a predetermined VIP. From that channel, the DET captures and executes the navigation program in real-time. Thus, real-time execution minimizes the amount of memory necessary for the DET; in addition, there is no need to establish a level 1 or level 2 gateway session to download software, thereby minimizing network traffic. Alternately, the DET may initially download a portion of the software (e.g. the executable code) during turn-on, and access menu data from the control channel when the user presses "GUIDE"; this variation will result in an increase in the execution speed of the navigation software. In another variation, the DET may download software and data during turn-on, and subsequently download only update data.

Figure 3:
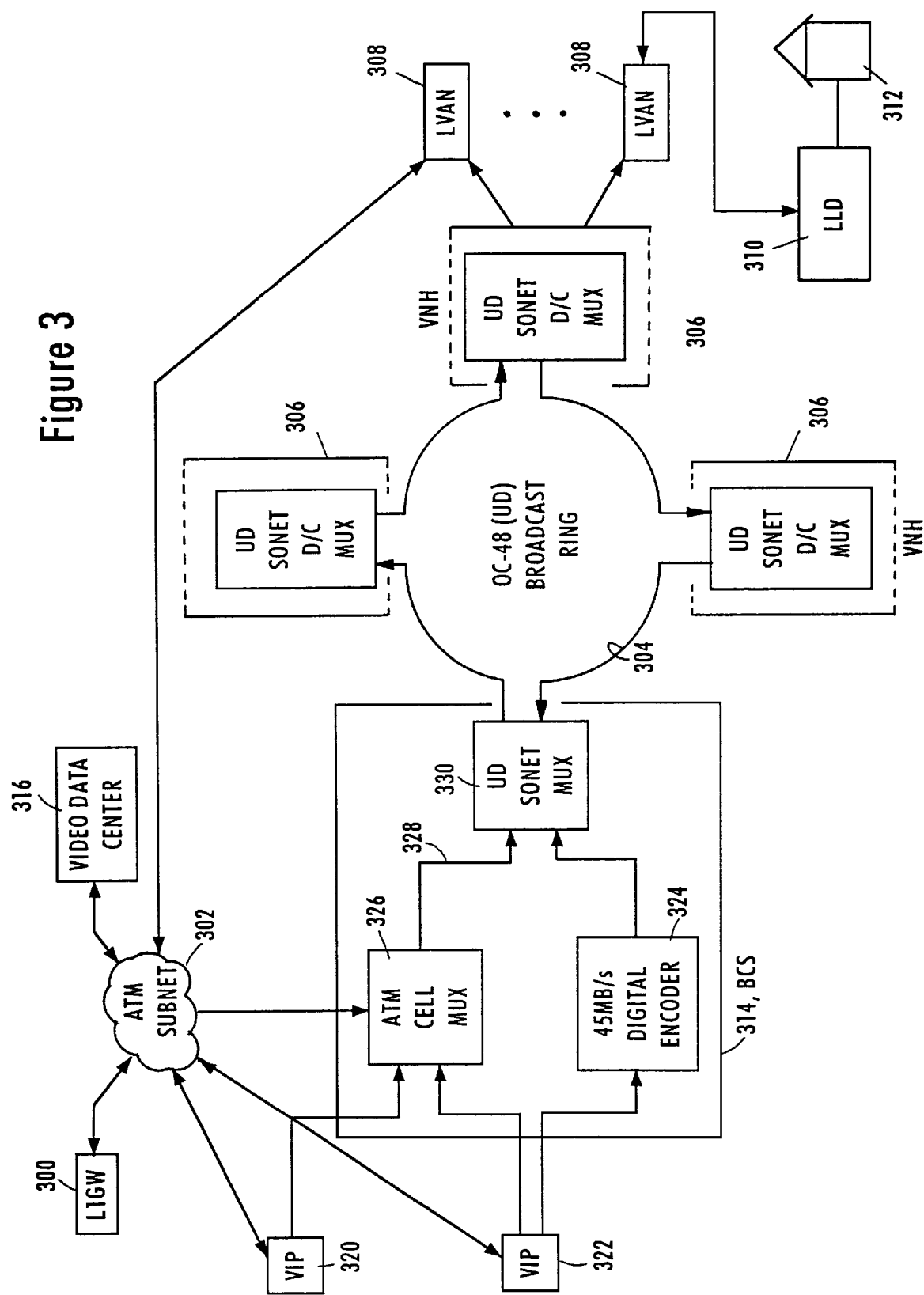
FIG. 3 is a block diagram of an exemplary network configuration for providing an array of broadcast and interactive services to the terminal of FIG. 1.

In networks having broadcast services, such as shown in FIG. 3 and/or as disclosed in the above cited Full Service Network application Ser. No. 08/250,792, at turn-on, the DET enters a mode for reception of the broadcast service. In such a case, the non-volatile memory in the DET stores operating system software including instructions for controlling selection of the broadcast services and a primary channel map storing connection block descriptors for identifying VIP services that are available on the network. The non-volatile memory may be loaded at the factory, or by a level 1 session with the network during registration of the DET. If interactivity with a particular VIP is desired, the level 1 gateway would be accessed in response to a user operating an appropriate button on the remote control, after which the user would select a VIP. The level 1 gateway controls the network to establish a broadband link to the VIPs server and at least an upstream narrowband signaling link to the VIP's level 2 gateway, and the DET interacts with the VIP's level 2 gateway and file server to obtain applications software programming and/or operating system changes, as discussed in more detail in the commonly-assigned application Ser. No. 08/250,791, filed May 27, 1994, (attorney reference 680-083) the disclosure of which is incorporated by reference.

As discussed in detail below with respect to FIG. 6, the loader program 202 and/or the OS 204 include programming enabling the DET 100 to provide a toggle functionality for selective execution of the resident application 206 and any VIP software application stored in the DRAM 122. In other words, the IR receiver 145 will receive a toggle command from a user's remote (see FIG. 7), which is decoded by the microprocessor 110. The microprocessor 110 decodes the toggle command as a request to suspend the current application being run, for example the VIP software stored in the DRAM 122, and to begin execution of the resident application 206 stored in the NVRAM 121. The resident application may then be used to select video dial tone services or to edit DET management functions in response to additional remote commands received by the IR receiver 145. Upon receipt of a second toggle command from the user's remote, the microprocessor suspends execution of the resident application 206 and resumes execution of the suspended VIP software stored in the DRAM 122. Additional details regarding the toggle function in the DET are disclosed below with respect to FIG. 6.

FIG. 3 is a simplified block diagram of an exemplary distributed network architecture for a broadband data full service type enhanced video dial tone network for providing broadband services to the digital entertainment terminal of the present invention. A more detailed disclosure of the preferred network is set forth in U.S. patent application Ser. No. 08/413,215, filed Mar. 28, 1995 (attorney docket no. 680-122), the disclosure of which is incorporated herein entirely by reference. To place the invention in the context of a practical network implementation, a summary description of the network follows, with specific reference to FIGS. 3 and 4.

The network of FIG. 3 includes a level 1 gateway 300, an ATM subnetwork 302 and an access subnetwork comprising a broadcast ring 304, video network hub offices (VNHs) 306, a plurality of local video access nodes (LVANS) 308, and a plurality of local loop distribution (LLD) networks 310 providing communications between customer premises 312 and the serving LVAN 308. The broadcast consolidation section (BCS) 314 may also be considered as a part of the access subnetwork. The network interface module (NIM) portion of the user terminal preferably also is a logical element of the access subnetwork and is controlled in response to instructions from an Access Subnetwork Controller within the video data center 316.

Figure 4:
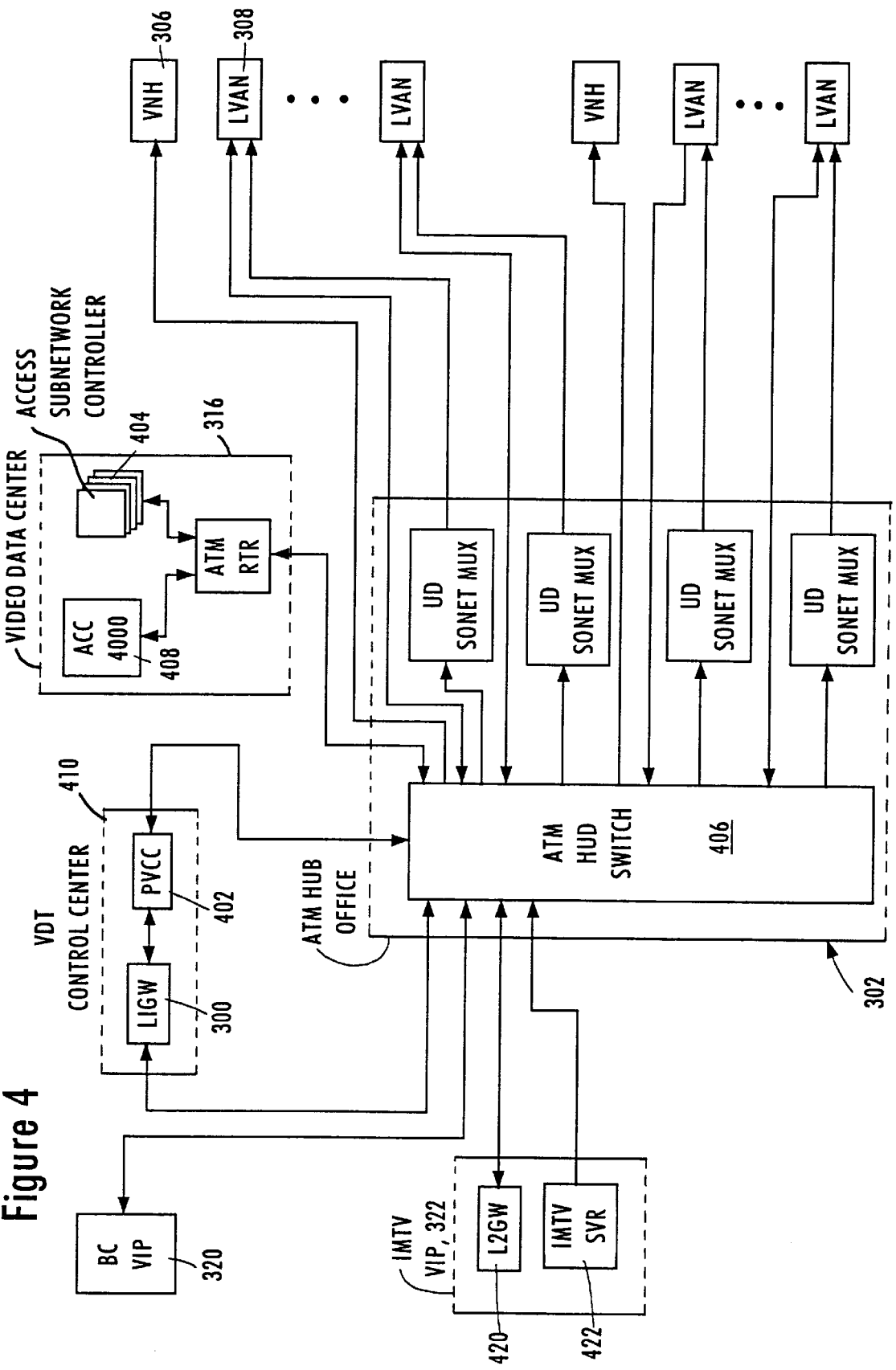
FIG. 4 is a block diagram of the ATM backbone network and the control systems for the network shown in FIG. 3.

Each subnetwork includes a subnetwork controller. For the ATM subnetwork 302, the controller is a PVC controller (PVCC) 402, shown in FIG. 4. The Access Subnetwork Controller 404 also is shown in FIG. 4.

The level 1 gateway 300 comprises a UNIX based computer having adequate processing power and data storage capacity. In this embodiment, the gateway 300 has an interface for two-way ATM cell based communication through the ATM backbone subnetwork. In an initial implementation, the level 1 gateway 300 has a direct data communication interface to the PVC controller 402, as shown in FIG. 4. In that implementation, the PVC controller 402 interfaces to the programmed control elements of the ATM hub switch 406 through an X.25 packet data interface.

In a future implementation, the PVC controller 402 will have an ATM interface to the hub switch 406. Through this interface, the PVC controller 402 will transmit instructions to the hub switch 406 and receive confirmations and various reports from the hub switch. The level 1 gateway 300 will also communicate with the PVC controller 402 using ATM through the ATM subnetwork, in a manner similar to the communications between that gateway and the Access Subnetwork Controller 404. The ATM interface between the PVC controller 402 and the hub switch 406 also will permit that controller to communicate with ATM access switches under its control.

The PVC Controller 402 and the Access Subnetwork Controller 404 also are computers having the appropriate network interfaces and software programming. The ACC 4000 408 is a computer system programmed to administer encryption keys and NIM network addresses in the hybrid-fiber-coax type access subnetwork. Computers similar to the ACC 4000 are used today in CATV headend systems, but those computers also run software relating to other CATV operations, e.g. billing.

The network shown in FIG. 3 is arranged to centralize signal processing tasks within a LATA in order to minimize hardware. At the same time, the disclosed network provides maximum flexibility by providing communications to local access nodes, each serving a local loop of subscribers.

The broadcast consolidation section 314 serves as the broadcast head-end and network interface for VIPs 320 and 322. VIP 320 is disclosed as a broadcast VIP, whereas VIP 322 provides both broadcast and interactive services. The broadcast consolidation section 314 is adapted to receive broadcast video data in any format that may be convenient for the VIP. Specifically, the broadcast consolidation section 314 includes a digital encoder 324 to convert baseband analog video signals, for example from VIP 322, into a digitally-compressed DS-3 signal stream. Alternatively, the digital encoder 324 could be replaced with an MPEG-2 encoder to provide compressed MPEG-2 packets at a DS-3 rate.

The broadcast consolidation section 314 also includes an ATM cell multiplexer 326, also referred to as an ATM edge device, which performs policing and rate conversion of incoming ATM streams. The ATM edge device 326 performs policing of ATM cell streams by monitoring the data rate of incoming data streams from VIPs. For example, if the VIP 320 has subscribed by contract to transmit a data stream at 3 Mbits/s to the network, the ATM edge device 326 will prohibit or drop ATM cells that are transmitted above the subscribed bit rate; in this case, a 6 Mbits/s stream would be rejected as an unauthorized rate.

Each of the VIPs 320 and 322 are preferably able to compress up to six (6) NTSC analog audio/video program signals in parallel into an MPEG-2 format. The resulting six (6) MPEG-2 packet streams with the appropriate overhead information are combined into a single MPEG-2 stream at 45 Mbits/sec (DS-3). The MPEG-2 streams are then converted into an ATM stream before transport to the ATM edge multiplexer 326. The ATM streams may be output at a 45 Mbits/sec (DS-3) rate for carrying up to six (6) MPEG-encoded programs, or on an optical fiber at 155 Mbits/sec (OC-3) for carrying up to twenty (20) MPEG-encoded programs.

The specific format of the ATM cell is described, for example, in the ATM User Network Interface Specification, Version 3.0, published by The ATM Forum, Mountain View, Calif., also published by Prentice Hall, the disclosure of which is incorporated in its entirety by reference. Each cell of a particular stream will have a header which contains a virtual path identifier/virtual circuit identifier (VPI/VCI) to identify the virtual circuit to which the cells pertain. All MPEG packets for a given program, whether video, audio or data, will be mapped into ATM cells having the same VPI/VCI. Conversely, cells having a given VPI/VCI will contain data corresponding to only one identified program. Thus, each ATM cell carrying video information for a specified program from a video information provider can be identified on the basis of its corresponding VPI/VCI.

The ATM edge multiplexer 326 acts as a groomer for multiple VIP terminations to prevent extraneous data from using network resources. The ATM streams from the VIPs 320 and 322 may arrive in either DS-3 format or via optical fiber in OC-3 format. The ATM edge device 326 provides a grooming function, whereby ATM cells are analyzed, on a cell-by-cell basis, to determine if they should be transmitted on the network. In addition, the ATM edge device 326 maps any ATM idle bits containing no information that are present in the ATM stream from the VIPs to a null port, thereby rejecting the received ATM idle bits.

The ATM edge processor 326 processes all incoming DS-3 bit streams received thereby, and maps the DS-3 bit streams into at least one condensed, or combined bit stream to OC-3c output buffers for synchronous transmission on optical fibers 328. Since the ATM cells are output at a rate of 155 Mhz (OC-3), each of the optical fibers 328 carry up to twenty (20) MPEG programs at 6 Mbits/sec. Thus, the ATM edge processor is able to fully load the downstream optical fibers 328 thereby to fully load the capacity of the network. A more detailed description of the ATM cell multiplexer 326 is found in copending and commonly-assigned application Ser. No. 08/380,744, filed Jan. 31, 1995 (attorney docket No. 680-109), the disclosure of which is incorporated in its entirety by reference.

According to the preferred embodiment, the digital encoder 324 outputs a digitally encoded data stream in DS-3 format (45 Mbits/s), and the ATM edge multiplexer 326 outputs an ATM stream in OC-3c format (155.5 Mbits/s), to a SONET multiplexer 330. The SONET multiplexer 330 multiplexes the DS-3 and OC-3 signals from the digital encoder 324 and the ATM edge multiplexer 326 and outputs the consolidated broadcast data onto the unidirectional optical fiber broadcast ring 304 operating at an OC-48 format (2488.3 Mbits/s). In other words, the SONET multiplexer 330 may receive a plurality of OC-3 optical fibers 328, either from the ATM edge multiplexer 326 or a plurality of such multiplexers. In addition, the SONET multiplexer 328 may receive a plurality of DS-3 signals from a corresponding plurality of encoders such as digital encoder 324. The SONET multiplexer 330 buffers the OC-3 and DS-3 input signals and multiplexes the input signals together at a rate of 2488.3 Mbits/sec. An exemplary SONET multiplexer is the FT-2000, manufactured by AT&T.

The broadcast ring 304 is arranged as a drop-and-continue (D/C) SONET transport to service up to sixteen (16) VNHs 306. Additional VNHs may be serviced by overcoming the distance limitations of the optical fibers. Although the broadcast ring 304 preferably has one OC-48 fiber, the broadcast ring 304 may be modified to include 2 or more OC-48 fibers for additional traffic, or for bidirectional traffic around the ring. Each VNH 306 receives the broadcast ATM streams from the broadcast ring 304, converts the ATM streams to MPEG-2 streams that are transmitted on an RF carrier, and adds local broadcast information (e.g., over-the-air access, public access channel) before transport to the associated LVANs 308 as RF signals, preferably via optical fibers.

Each LVAN 308 receives the consolidated broadcast data from the corresponding VNH 306. The LVAN 308 combines the received RF signals from the VNH 306 with any data transmitted by the ATM backbone subnetwork 302 addressed to a subscriber served by the LVAN 308, such as interactive data for an IMTV session. The resulting RF signal is transmitted via a local loop distribution network 310 to a number of customer premises 312 (only one shown for convenience). The local loop distribution 310 is preferably arranged as a hybrid fiber-coax distribution system, although an ADSL system or a fiber-to-the-curb system may be substituted. Detailed descriptions of the VNHs and the LVANs appear in the above incorporated Ser. No. 08/413, 215 (attorney docket no. 680-122) application.

The equipment at the subscriber site 312 includes a network interface device (NID) for splitting the RF signal, the network interface module (NIM) 101 for decoding encrypted data from the network and routing MPEG data streams, and the digital entertainment terminal (DET) 100 for decoding the MPEG data streams passed by the NIM 101. Additional details regarding the NIM are discussed below with reference to FIG. 5.

Each LVAN 308 has access to the ATM backbone subnetwork 302 in order to send and receive network signaling information to and from the level 1 gateway 300 and/or the video data center 316 or the video control center 410. For example, a video information user (VIU) who wishes service on the network via one of the LVAN's 308 may request the service either by calling a network business office by telephone or by requesting a level 1 gateway session from his or her customer premises 312 using the resident application 206 in the DET in order to perform on-line registration. The ATM backbone subnetwork 302 provides signaling information between the LVAN 308 serving the VIU, the level 1 gateway 300 and the video data control center 316 in order to activate the VIU on the network, or to update the services available to the VIU.

The ATM backbone subnetwork 302 also is adapted to communicate with the VIPs 320 and 322 in order to perform account management between the VIPs, the level 1 gateway 300 and the video data control center 316. The VIP 322 may also conduct an interactive (IMTV) session with a VIU via the ATM backbone subnetwork 302 and the LVAN 308 servicing the specific VIU. As shown in FIG. 4, the VIP 322 can conduct IMTV sessions with a VIU executing the VIP software stored in the DRAM 122 of the DET (see FIG. 2) by using a level 2 gateway 420 and an IMTV server 422 internal to the VIP 322. The level 2 gateway 420 communicates with the level 1 gateway 300 of the network to receive and process requests for IMTV sessions. The IMTV server 422 outputs broadband data for the VIU as an ATM cell stream to the ATM backbone subnetwork 302.

Communication between the network and the VIP 322, as well as between the network and the VIU, is established under control of the level 1 gateway 300. From the VIU perspective, a user will use the resident application 206 to communicate with the network via the level 1 gateway 300 in order to select the VIP 322 for an IMTV session. In a network providing access to multiple IMTV service providers, the user wishing to establish an IMTV session identifies the provider of choice to the level 1 gateway 300 by inputting control signals to the user's DET, which supplies the appropriate signals upstream from the customer premises 312 to the level 1 gateway 300 via the corresponding LVAN 308 and the ATM backbone subnetwork 302. In response, the level 1 gateway 300 controls the broadband routing functionality of the network to establish a downstream broadband communication link and a signaling link between the provider and the user.

The level 1 gateway 300 receives notification of the status of broadband communications links as they are being set up and during ongoing communications through those links. The level 1 gateway 300 therefore can inform a subscriber when a requested session can not be set up with a selected service provider, i.e. because the provider's server ports are all busy or because the subscriber is not registered with the particular provider or due to some technical problem. The level 1 gateway 300 also recognizes when an established link develops a fault or is interrupted and can stop accumulating usage or billing data regarding that link. The level 1 gateway 300 can also notify the subscriber and/or the service provider of the failure.

The level 1 gateway 300 will also store various information relating to each subscriber's services and provide high level control of services through the network accordingly. At least some of this stored data is accessible to the subscriber through a direct interaction with the level 1 gateway 300. For example, the user can use the resident application 206 to identify certain service providers to the level 1 gateway 300 and define an authorization code or identification number which must be input before the network should provide a session with the user's equipment 312 and the identified providers.

Many of the functions of the level 1 gateway 300 relate principally to set up, monitoring and billing for point-to-point type interactive sessions. As noted above, however, a number of the gateway functions also apply to broadcast services. A more detailed description of the functionality of the level 1 gateway is found in commonly-assigned, copending application Ser. No. 08/413,812, filed Mar. 28, 1995 (attorney docket no. 680-093A) entitled "Level 1 Gateway for Video Dial Tone Networks", the disclosure of which is incorporated in its entirety by reference.

As discussed in more detail below, reception of a particular digital program requires that the CPE terminal device know the RF channel transporting the program and at least one PID value associated with the program. Preferably, the PID value is that of the program map for the particular desired program. Although the transport stream may include the program association table in packet PID 0 to insure compliance with the MPEG standard, the downloading of the PID value for the program maps (instead of a program number to access data from the program association table) eliminates processing time delays in channel surfing required to capture PID 0 packets. The Access Subnetwork Controller 404 maintains tables which correlate PID values, particularly for program maps in each output stream, to logical channel numbers. The Access Subnetwork Controller 404 includes these PID values in connection block descriptors supplied to the level 1 gateway 300 for subsequent downloading to the DETs.

The NIM 101 provides broadband data to the DET 100 by demodulating the downstream RF signal at a user-specified channel frequency. If the demodulated RF signal is an analog video signal from an analog source, the NIM 101 passes the baseband analog video signal directly to the television set without further processing by the DET 100.

If, however, the NIM 101 receives an MPEG encoded signal, the NIM 101 will de-encrypt at least a selected portion of the 27 Mbits/s MPEG encoded signal using a key downloaded from the network's ACC-4000. Upon de-encrypting, the NIM 101 supplies the 27 Mbits/s MPEG encoded signal to the main portion of the DET 100 for further processing to present a selected program to the user.

The NIM 101 also demodulates a downstream signaling channel carrying signaling data in MPEG packets. From the signaling channel, if the MPEG encoded signal has a PID value corresponding to the NIM address, the NIM 101 processes the MPEG stream as NIM signaling data. If, however, the PID value corresponds to the DET address, the NIM 101 extracts the data from the MPEG stream and outputs that data to the DET CPU. Alternatively, the NIM and DET may have a single PID value address, in which case, data within the signaling packet indicates whether the message is for the NIM or the main portion of the DET.

As noted above, the DET is an open interface device in that it interacts with equipment of a large number of service providers (often referred to as "VIPs") to offer users a wide array of video and interactive multi-media services. The digital entertainment terminal (DET) is a programmable device to which different individual video information providers (VIP's) can download applications software into the DRAM 122, and at least one VIP (the VIP selling the DET) can download all or a part of the operating system into the NVRAM 121.

The NIM 101 provides the interface necessary for the DET 100 to communicate with the local loop distribution system 310. The structure of the NIM 101 is dependent on the local access technology (in this case, hybrid-fiber coax). The NIM 101 provides standardized control signals to and from the DET 100, Consequently, the main portion of the DET 100 can be implemented as a generic consumer product that is independent of the local access technology, whether it is hybrid-fiber coax, ADSL, satellite receiver, or fiber to the curb.

Figure 5:
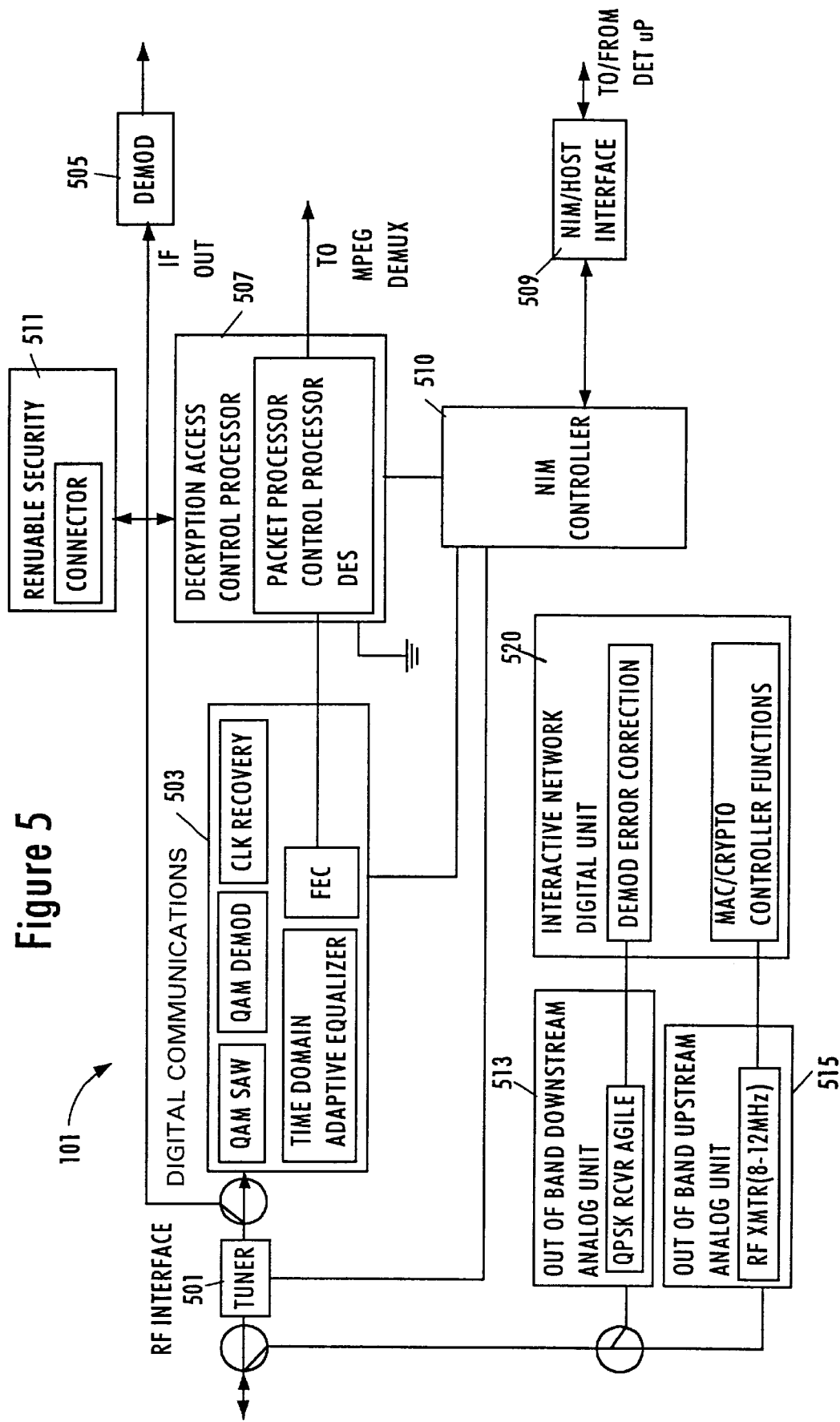
FIG. 5 is a block diagram of the network interface module (NIM) used to interface the digital entertainment terminal to the network of FIG. 3.

FIG. 5 depicts a NIM 101 for interfacing a DET to the network of FIG. 3. The structure illustrated is based in part on the preference for QAM modulation techniques for the digital video signals in a network of the type shown in FIG. 3. The input to the NIM is a broadband RF signal provided from a coaxial distribution drop. The tuner 501 selects a specific 6 MHz channel from the broadband input spectrum and presents it at an intermediate frequency to the digital communications section 503, and through the IF output port to an analog video/audio demodulator 505. Although illustrated as part of the NIM, the demodulator may be an element of the host DET. The baseband audio video signals are selectively supplied as alternate outputs to the baseband output terminals and as alternate inputs to the RF output modulator 139 (see FIG. 1). The digital communications section 503 includes a QAM demodulator 503a that performs adaptive equalization, demodulation and forward error correction on signals in a specified one of the digital channel slots from the tuned RF channel and outputs a corrected serial baseband digital feed. The decryption module 507, when properly authorized by the access subnetwork controller and ACC 4000, decrypts packets identified by selected MPEG PIDs, as directed by the DET microprocessor, via the host interface 509 and the NIM controller 510. The composite MPEG transport multiplex with appropriately decrypted components is output from the NIM 101 to the host DET's demultiplex and decompression circuitry as shown in detail in FIG. 1.

In the illustrated preferred embodiment, communication between the host microprocessor 110 and the NIM 101 is via a dual port memory connected as the NIM host interface 509. The shared memory provides mailboxes and buffer regions which are used to transfer messages and commands between the host microprocessor and the NIM 101. Messages passing through this link include interactive traffic to the level 1 and 2 gateways, tuner control commands, specification of appropriate PIDs for decryption, general housekeeping data, etc. The shared memory also is adapted to store data automatically downloaded from the network while the host microprocessor is in idle or standby state; thus, the host microprocessor is able to load the received data during the next turn-on.

In the network of FIG. 3, the complete cable RF spectrum is input to the NIM 101 (FIG. 5) via a 75 ohm connector. The RF tuner 501 translates the desired channel, containing either digital or analog information, to a 43.75 MHz IF signal. The IF signal contains either digital or analog information. The tuner 501 utilizes a dual conversion technique with synthesized local oscillators, and has an input tuning range of 50 MHz to 860 MHz.

The 64 QAM demodulator 503a comprises three submodules: DMAU, DMDU, and FEC. This module demodulates the QAM signal to digital form, and performs forward error correction (FEC) decoding, and it provides a baseband digital signal to the Decryptor Module 507. The DMAU contains the SAW filter, the QAM demodulator, carrier and clock recovery loop components and AGC control signal generation for the tuner 501. The DMDU contains an adaptive equalizer, AGC control signal generation for the DMAU, and error generation functions for the clock and carrier recovery loops. The FEC module executes concatenated Viterbi (Trellis) and Reed Solomon error correcting functions.

The Decryptor Module 507 receives the baseband digital data information stream from the demodulator, and control/authorization information from the NIM controller 510. When authorized, this module 507 decrypts the packets identified by appropriate PIDs in the data stream. The high speed data containing decrypted packets is then passed out of the NIM to the host terminal. This module employs a DES type decryption algorithm and a key hierarchy to provide access control and decryption. The specific algorithms may be modified through the use of a TV Pass Card which is inserted in the renewable security slot 511.

In the network of FIG. 3 signal transport over the fiber/coax distribution system may be out of band. The interactive network interface components in the NIM 101 provide communication facilities between the terminal and the central office. The physical layer interface comprises either a 64 QAM in-band transport multiplex receiver or the frequency agile QPSK out-of-band receiver 513 illustrated in FIG. 5. A QPSK transmitter 515 relays the upstream signal over the 8–12 MHz band on the coaxial drop. The medium access control and administrative functions are performed by the level 1 gateway 300 and the access subnetwork controller 404. Together these elements provide a message transfer facility for interactive traffic between the central office and the DET. Although not specifically shown in FIG. 3, signaling communications to and from the gateways are routed through the ATM switch.

The NIM controller 510 (FIG. 5) provides an interface between the host DET terminal device and all elements of the network interface module (NIM) 101. All commands and messages transfer between the host and the NIM controller via the dual ported RAM type interface 509. The NIM controller 510 also handles all housekeeping functions associated with the tuner 507, QAM demodulator and decryption subsystems.

The network assigns each NIM 101 to a default channel for downstream reception and a default channel for upstream transmission. The connection block descriptors for the assigned default channels are stored in the data memory portion 208 of the NVRAM 121. The QPSK demodulator and the QPSK modulator within the NIM can also shift to other channels allocated on a dynamic basis, e.g. to provide signaling for IMTV services requiring more bandwidth than is available through the default channels. If the narrowband digital signal is signaling information for the main portion of the DET 100, the signaling information is supplied to the DET microprocessor as raw data, for appropriate processing. If the digital narrowband signal is signaling information for the NIM 101, the processor within the NIM receives and processes the information.

The DET 100 captures and processes a digital program based on the RF channel and the PID value associated with the program map for the particular source program. As noted above, the program map specifies the PID values for packets continuing video, audio and/or data from the particular source. For example, HBO might be one of four digital programs carried in RF channel 53, and the program map for HBO might be found in packets corresponding to PID 132. The program map for CBS in the packet with PID 132 would then identify the PID numbers for the actual packetized elementary streams (PES) for the data (if any), video and audio channels associated with the HBO program. Once the DET 100 identifies and captures the program map table, the MPEG decoder section can extract the video elementary stream, the audio elementary stream(s) and any associated data stream for decoding of the programming.

In the preferred network implementation, the NIM 101 stores the decryption keys that are supplied from the ACC 4000 408. The NIM uses those keys to decrypt selected programs before supplying the program signals to the main portion of the DET.

A more detailed description of the structure of the DET and NIM and the operations thereof involved in downloading applications software and operating system changes into the DET through a network similar to that of FIG. 4 are disclosed in copending application Ser. No. 08/380,755, filed Jan. 31, 1995 (attorney docket No. 680-083C), incorporated herein in its entirety by reference.

As noted above, the DET provides a toggle functionality enabling a user to toggle between a VIP application and a resident application. For example, a user may wish to suspend a VIP application in order to order pay-per-view services using the resident application. Subscribers are able to order services such as pay-per-view events in a number of different ways, and each VIP offering such services may elect to allow subscribers to use any one or more of the available ordering techniques, depending on how each VIP chooses to set up the VIP's pay-per-view services. The VIU may place an order with the VIP, either by a standard telephone call or during an interactive session through the video dial tone network using the VIP software stored in the DRAM 122. In these cases, the VIP will provide the order information to the level 1 gateway, either directly through the ATM backbone subnetwork or through the network's operational support system (OSS).

Alternatively, the VIU may order pay-per-view events through an on-line interaction with the level 1 gateway 300 using the resident application. In such a case, the VIU could suspend a VIP application (such as an interactive game) in order to perform on-line registration using the resident application and thereafter resume the VIP application. The level 1 gateway session is initiated by the user requesting a service from the video dial tone services menu (discussed in detail below) in the resident application. The DET accesses the connection block descriptors stored in memory 208 for the downstream and upstream default signalling channels, tunes the NIM accordingly, and sends a session request to the level 1 gateway via the default upstream signaling channel. The level 1 gateway in turn responds by sending a message down the downstream default signaling channel containing the connection block descriptor for the assigned downstream broadband connection. After the NIM is tuned to the assigned channel, the DET is able to decode the broadband information for the level 1 gateway session.

The level 1 gateway 300 will provide menus through the DET 100 and the associated television, and the user can operate the remote control of the DET to transmit selection information (VIP and pay-per-view event) back to the level 1 gateway. Different VIPs will require different levels of security. For example, a first broadcast VIP may choose to pre-authorize pay-per-view purchasing by all VIUs who subscribe to that VIP's broadcast pay-per-view services. The level 1 gateway 300 therefore would only need to check its internal database to determine if the current VIU subscribes to the pay-per-view services of the selected VIP. Alternatively, another VIP may require that the level 1 gateway 300 signal the VIP's equipment to identify the VIU and the ordered event, so that the VIP can validate subscription and authorize or deny the purchase for each VIU purchasing the event. The level 1 gateway may support a variety of other security scenarios, for example preauthorization for all of the VIP's subscriber's for events priced below a specified threshold value and validation of the VIU purchase by the VIP for events priced above the specified threshold value.

In each of the ordering techniques described above, the level 1 gateway receives a request message to activate the VIU for reception of the pay-per-view event. The activation request identifies the VIU's DET, e.g. by its assigned E.164 address, and includes the event ID for the pay-per-view event that this VIU has purchased.

In response to the VIU activation request, the ACC-4000 408 sets up a communication with the NIM 101 and downloads a decryption key for the channel for storage in the NIM. More specifically, the ACC-4000 408 transmits a message using the default channel and the PID value assigned as the NIM network address for the particular DET 100. This message specifies start time, event duration and the decryption key needed to decode the selected event. The NIM 101 monitoring its default channel, recognizes its network address and captures the packet of message data for further processing. In the present case, the NIM 101 responds to the message by adding the decryption key for the program to its memory and stores the duration information.

The NIM 101 may also transmit back a confirmation message. Thereafter, the level 1 gateway 300 transmits a facility message to the main portion of the DET 100 through the downstream default signaling channel. This facility message contains at least the event ID and the start time. The facility message may also include the current time and the end time or duration of the event. If the facility message includes the current time, the DET 100 uses that time value to reset its internal clock to the current value of the network time clock.

If the network has not already supplied the connection block descriptor, the facility message would provide the connection block descriptor to the main portion of the DET 100. The main portion of the DET 100 stores the information from the 'facility' message in memory.

At the time of the event, a user activates the DET 100 to select viewing of the pay-per-view event. The main portion of the DET 100 accesses the stored connection block descriptor for the channel carrying the event. The main portion of the DET 100 supplies a connect message to the NIM requesting that the NIM supply signals from the specified RF channel number to the main portion of the DET. In response to the RF channel number, the selected NIM 101 tunes to the identified channel, and the NIM 101 uses the encryption key from its memory to descramble the tuned RF signal. As a result, the NIM 101 passes digital signals from the RF channel through the interface to the main portion of the DET 100. In turn, the main portion of the DET 100 uses the PID value from the connection block descriptor to begin MPEG decoding of the selected program and provide signals to the associated television set so as to provide an audio/visual display of the ordered pay-per-view event.

In addition, the user may use the resident application to establish an interactive session with the level 1 gateway 300 that results in the VIU selecting a specific one of the IMTV VIPs connected to the enhanced video dial tone network. If the DRAM 122 shown in FIG. 2 is segmented into regions 122a, 122b and 122c, the VIU may store a plurality of VIP applications and establish multiple IMTV sessions.

During the level 1 gateway session, the level 1 gateway 300 transmits a set-up message to the main portion of the DET through the still existing downstream interactive link with the DET 100. This message contains the connection block descriptor for the downstream channel and the RF channel assignment and packet identifier assigned for the upstream channel. The main portion of the DET 100 stores the connection block descriptor in its memory and supplies the upstream channel information to the control processor of the NIM 101 for use in transmitting upstream signaling messages. The DET 100 returns a confirmation message back through the upstream signaling channel to the level 1 gateway 300. In the present example, this message goes through the upstream default channel.

The 'set-up' message and corresponding reply message also indicate an end to the current session between the level 1 gateway 300 and the DET 100.

At this point, the level 2 gateway 420 instructs the server 422 to begin transmitting downstream information through the assigned virtual circuit through the ATM backbone subnetwork 302 and the assigned logical network channel through the access subnetwork. The main portion of the DET supplies a connect message to the NIM 101 requesting that the NIM supply signals from the RF channel number specified in the connection block descriptor to the main portion of the DET. In response to the RF channel number, the NIM 101 tunes to the identified channel, and the NIM 101 uses the decryption key from its memory to descramble the tuned RF signal. As a result, the NIM 101 passes digital signals from the RF channel through the interface to the main portion of the DET 100. In turn, the main portion of the DET 100 uses the PID value from the connection block descriptor to begin decoding and processing of MPEG packetized signals from the level 2 gateway 420.

For each upstream signaling message, e.g. responsive to a user input, the processor in the main portion of the DET 100 supplies a message to the processor of the NIM 101. Under the later processor's control, the NIM packetizes the message using the assigned identifier and transmits the packet(s) upstream over the assigned RF channel, using QPSK modulation.

Using these established downstream and upstream paths, a two-way interactive session ensues between the VIU operating the DET 100 and the IMTV VIP system 322. Typically, the IMTV VIP system 322 begins by transmitting the VIP's application software. The DET stores the software and executes the software, to control the interactive functionality of the DET for the duration of the session with the IMTV VIP.

Figure 6:
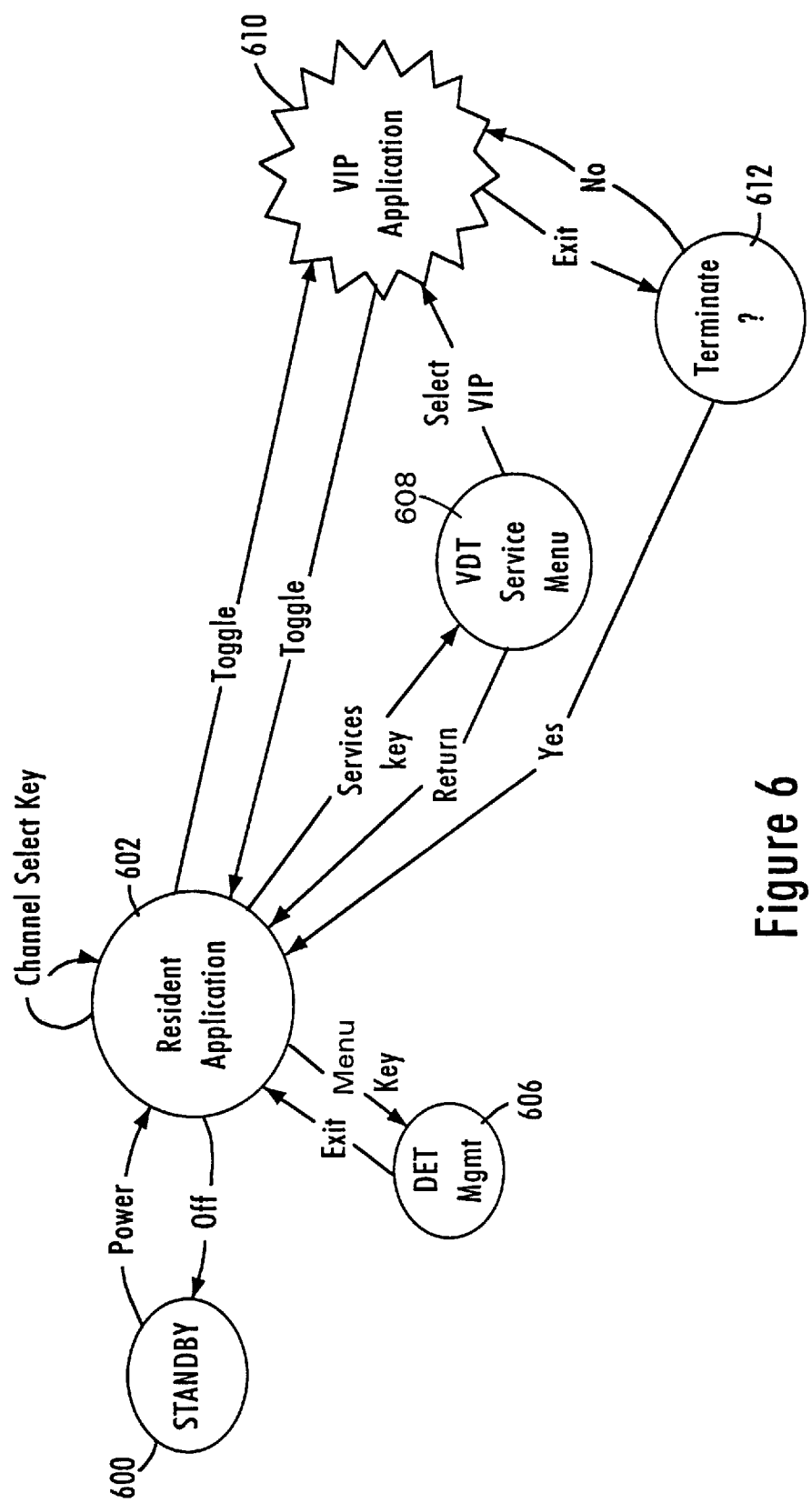
FIG. 6 is a state diagram showing the operation of the digital entertainment terminal according to the present invention.
Figure 7:
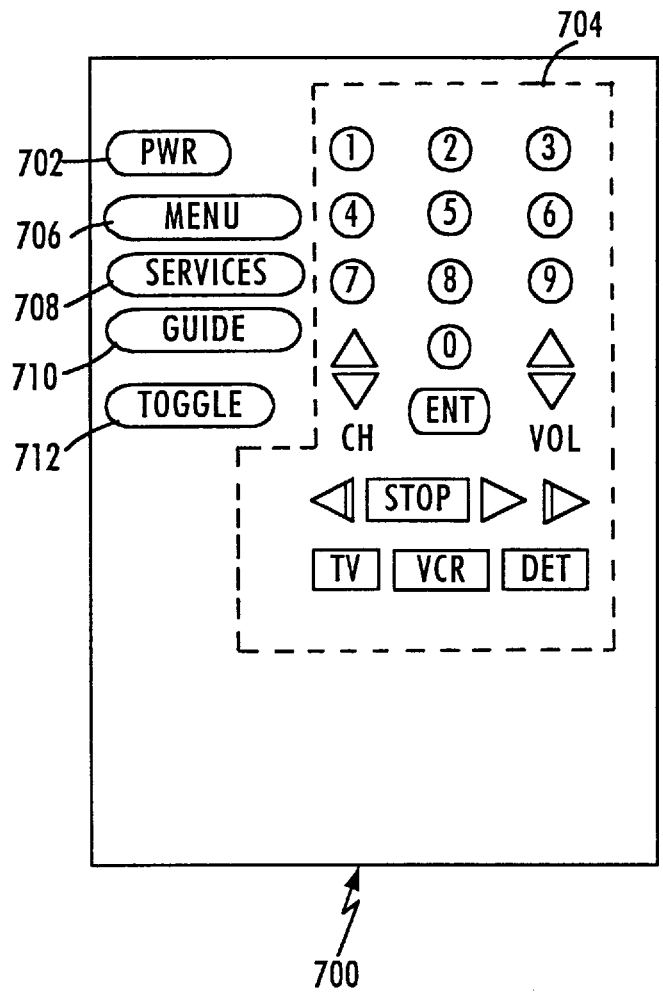
FIG. 7 is a diagram illustrating a remote control unit for use with the digital entertainment terminal of FIG. 1.

FIG. 6 is a state diagram of the operation of the digital entertainment terminal according to the present invention. As shown in FIG. 6, the digital entertainment terminal 100 has different states of execution, depending upon the commands received from a user. As shown in FIG. 7, a user's remote control unit 700 will typically include a power key 702, a plurality of programmable data keys 704, similar to a remote VCR remote unit. In addition, the remote unit will include keys that specify a specific function in the DET 100. For example, the remote control unit 700 for the DET 100 will preferably include a "menu" key 706, a "services" key 708, a "guide" key 710 and a "toggle" key 712.

As shown in FIG. 6, the DET 100 includes a standby state 600 whereby the CPU 105 of the DET 100 is inactive. During the standby state 600, the power is supplied to the DET 100 only to maintain the system memory 120. In the event of a power failure, the NVRAM 121 preferably has up to 16 kilobytes of a battery backed NVRAM capable of surviving a power outage lasting up to 720 hours.

Upon pressing a power key 702, the DET 100 switches from the standby state 600 to a resident application state 602. As discussed above with respect to FIG. 2, the resident application state 602 will begin with diagnostic routines and set up procedures performed by the loader program 202 and the operating system 204. Upon completion of the necessary diagnostics and set-up, the DET executes the resident application 206 stored in the nonvolatile memory 121. The resident application, also referred to as the native application, enables viewing of selected broadcast channels from the particular network. A user may view different broadcast channels in the resident application state 602 by depressing the channel select key(s) from the group of data keys 704. The channel select key operation may utilize the user's remote control, either by activation of up/down keys, or by manually entering a numbered channel on the key pad. If the resident application state 602 is left for another state, such as the standby state 600, the resident application state 602 returns to the last viewed channel when the DET resumes that state 602. If the VIU directly enters an unauthorized broadcast channel, a text message overlay is displayed notifying the VIU that the desired channel is not authorized or is invalid. After five seconds, the message is removed and the VIU remains tuned to the current channel.

A VIU may enter the DET management state 606 by selecting the menu key 706 from the resident application state 602 while watching the current channel. If the VIU selects the menu key 706 from within a VIP application, any menu structure defined by the VIP application is displayed. The DET management state 606 causes a display of a DET administration main menu which enables a user to perform channel event notification, channel list administration, personal identification number (PIN) administration, parental control, second audio program (SAP) administration, or access a help menu. Each of the above-identified items are managed using a sub-menu structure enabling a VIU to invoke an existing list, edit an existing list, establish a new list, or delete an existing list. The channel lists can be personalized, saved under the VIUs name or under a category definition (e.g., sports, entertainment, education, etc.).

The VIU can select the channel list administration sub-menu to manage customized channel lists in the resident application. Channel list administration enables the VIU to establish, modify, and personalize a specific list of channels that are accessed. The VIU can also select the PIN administration sub-menu to add, change or delete a PIN in order to invoke channel blocking. If the VIU forgets a PIN, the PIN must be reset by the VIP responsible for the resident application, or alternatively by the network.

The parental control sub-menu allows the VIU to invoke parental control by designating the parameters for channel blocking. SAP administration allows a VIU to select a different audio program if the program viewed simulcasts different foreign language tracks, or a high fidelity sound track. Event notification alerts the VIU immediately prior to the start of a purchased paid per view event that the event is about to begin.

A VIPs application may be loaded into the DET 100 two ways. The first way is from the resident application state 602, whereby a user viewing a channel that is provided by a particular VIP presses the 'guide' key 710 to cause the VIP's navigation software to be downloaded into the DRAM memory 122, e.g., from the VIP's control (guide) channel. As discussed above, the navigation software may be loaded by accessing a channel map within the memory portion 208 of the NVRAM 121 that identifies the connection block descriptors for the control channel of the particular VIP that cyclically broadcasts the navigation software. An alternative method for downloading VIP software is by pressing the 'services' key 708 while in the resident application state 602 in order to display the video dial tone (VDT) services menu 608. The VDT services menu 608 is part of the resident software 206 stored in the NVRAM 121, and as such is a specialized part of the resident application state 602. From the VDT services menu 608, the VIU is able to select available services via a level 1 gateway session. Specifically, the VDT services menu 608 enables a VIU to select broadcast services, pay-per-view services, interactive services, or VDT administration.

For broadcast services, the VDT services menu 608 enable a VIU to view a list of broadcast VIPs, whereby the VIPs to which the VIU is currently subscribed are highlighted. If the VIU selects a VIP to which he/she is not subscribed, then an appropriate text overlay message is displayed, and after five seconds the VIU is returned to the list of broadcast VIPs. The VIU may then be given the option for on-line registration by a level 1 gateway session. If the VIU selects a VIP to which he/she is subscribed and the VIP does not use an application download, then the NIM tunes to the channel determined by the VIP identified by the connection block descriptors stored in memory 208, at which point the DET 100 returns to the resident application state 602 for viewing the particular tuned channel. If, however, the VIU selects a VIP which uses a data carousel, also referred to as a navigation software, then selection of that VIP causes the VIPs application to be loaded into the DRAM memory 122 from the broadcast channel carrying the software data carousel. Once the downloading is complete, the DET 100 executes the VIP application in state 610.

In a similar manner, the VDT services menu 608 enables a VIU to select pay per view services. The VIU may select the pay-per-view event through a level 1 gateway session. Alternatively, if the VIP uses a data carousel and supports on-line pay per view event ordering, then the VIPs application is loaded into the DRAM 122. Once the downloading of the VIP application into the DRAM 122 is complete, the VIP application is executed in state 610 enabling the VIU to order the desired pay-per-view event or enhance pay-per-view events.

As discussed above, the level 1 gateway session can also be used to order interactive services from a particular VIP. The interactive services may include video on demand, educational applications, interactive shopping, interactive digital broadcast services, on-line ordering of pay per view events, or interactive data such as on-line services such as America On Line, Prodigy, or Compuserve, home banking and financial services, and news and information services. Upon selecting one of the interactive services, the application is downloaded into the DRAM, after which point the VIP application is executed in state 610.

Finally, the VDT services menu provides VDT administration related to administrative functions with selected VIPs, such as VIP blocking, PIN administration, text language preference, etc.

The VIP application state 610 identifies the state in which the DET 100 is executing the VIP application stored in DRAM. According to the presently preferred embodiment, the entire DRAM 122 is used to store only one VIP application, so that any downloading of VIP applications overwrites previously-stored applications. Alternatively, the DRAM may be segmented into regions 122a, 122b and 122c so that a plurality of VIP applications $SW_a$, $SW_b$, and $SW_c$ may be stored.

As suggested above, the VIP application may be either a navigation software, an on-line pay per view ordering application, or an interactive application. If the VIP application is a navigation software, the VIU may use either the native application or the VIP application to select broadcast services provided by the VIP. To use the VIP application, the user inputs the desired selection using the programmable data keys 704 for processing by the VIP application.

If, during execution of the VIP application in state 610, the VIU wishes to return to the resident application, the VIU presses the "toggle" key 712 on the remote unit. By pressing the "toggle" key 712, the VIP application stored in DRAM 122 is suspended and the CPU 105 resumes application of the resident application 602. The VIU is able to perform all functions in the resident application 602, including jumping to the DET management state 606 using the menu key 706, or using the channel select keys to manually select different broadcast channels (i.e., channel surfing). The suspended VIP application stored in the DRAM memory 122 is not affected during execution of the resident application so long as the user does not request another download of another VIP software using the services key. If the VIU returns to the VDT services menu 608 and selects the same VIP, then execution of the VIP application in state 610 resumes. If, however, the VIU selects a different VIP in the VDT services menu 608, then the software for the newly-selected VIP is downloaded into the DRAM 122, and the suspended VIP application previously stored in the DRAM 122 is overwritten.

However, if the DRAM 122 is segmented for multiple VIP applications, then the toggle key 712 can be used to sequentially access the different VIP applications. Thus, if multiple VIP applications are stored in the DRAM memory 122a, 122b and 122c, then the multiple VIP applications may be successively executed and suspended each time the toggle key 712 is pressed.

Thus, each time the toggle key 712 is pressed, a different application is executed. The DET retunes the NIM 101 in accordance with the corresponding connection block descriptors in order to receive the appropriate broadband data. Hence, the DET 100 is capable of having multiple IMTV sessions executed in parallel, whereby the VIU may effectively surf between different IMTV applications merely by toggling between the application, causing the NIM and DET to receive a different bandwidth of information based upon the corresponding connection block descriptor. Thus, for multiple IMTV sessions, the NIM would scan for different portions of the downstream network bandwidth, based upon the corresponding connection block descriptors.

During execution of the VIP application in state 610, the VIU may press a programmed "exit" key to terminate the application. The VIU is first prompted with a terminate question to verify that the VIU wishes to terminate the application in step 612. If the VIU indicates "yes", then the VIP application stored in the DRAM 122 is halted and the DET 100 returns to the resident application in state 602 to resume execution thereof. If, however, the user in state 612 indicated "no", the DET 100 resumes execution of the VIP application 610.

According to the present invention, the digital entertainment terminal enables a user to selectively execute different applications stored in the memory. Depending on the memory configuration, a user may toggle back and forth between the resident application and a downloaded VIP application. Alternately, the user may effectively surf between applications including the resident application and a plurality of separately downloaded VIP applications, using the toggle key, or by identifying by numerical designation (0–3) the stored program to be executed.

Similarly, it will be readily apparent to those skilled in the art that the digital entertainment terminal of the present invention enables a user to simultaneously perform multiple interactive sessions between the level 1 gateway and the level 2 gateway's of different information providers. Depending on the VIP application, the VIP application may self terminate after a predetermined time if no response is received from the user. Alternately, the toggle function may be combined with a pause function that sends an upstream signaling message to the VIP to pause the downstream transmission of broadband data. However, the toggle function may also be set up so the broadband data is continuously transmitted, such that the broadband data is disregarded by the NIM and DET while the VIP application is suspended.

While this invention has been described in connection with what is presently considered to be the most practical and preferred embodiment, it is to be understood that the invention is not limited to the disclosed embodiment but, on the contrary, is intended to cover various modifications and equivalent arrangements included within the spirit and scope of the appended claims.

What is claimed is:

1. In a digital entertainment terminal adapted to receive broadband information from at least one information provider via a broadband data network, the digital entertainment terminal comprising a first memory for storing a first executable data enabling communication between the digital entertainment terminal and the broadband data network, a second memory for storing second executable data from the at least one information provider, and a user interface for receiving inputs from a user, a method for receiving the broadband data in response to user inputs, comprising the steps of:

executing a first portion of said second executable data from said at least one information provider and stored in said second memory in response to a first user input;

receiving first broadband information from said at least one information provider in response to said first portion executing step; and suspending said first portion executing step and executing said first executable data in response to a second user input; said method further comprising the steps of receiving second broadband information during said executing of said first executable data, comprising the steps of:

accessing a connection block descriptor stored in said first memory corresponding to said second broadband information, said connection block descriptor comprising network interface access data and program decoding data;

supplying said network interface access data to a network interface coupled to said digital entertainment terminal for communication with the broadband data network;

receiving encoded data from said network interface in response to said supplying step; and decoding said encoded data with said program decoding data to obtain said second broadband information.

2. A method as recited in claim 1, wherein said accessing step comprises the step of selecting said connection block descriptor from a channel map stored in said first memory in response to a third user input, said channel map comprising a plurality of said connection block descriptors having a respective plurality of program identifiers, said third user input corresponding to a selected one of said program identifiers.

3. A method as recited in claim 2, further comprising the step of resuming said first broadband information receiving step in response to a fourth user input, said resuming step comprising the steps of suspending said execution of said first executable data, and resuming execution of said first portion.

4. A method as recited in claim 3, wherein said resuming execution of said first portion comprises the steps of:

accessing a second connection block descriptor stored in said first memory corresponding to said first broadband information;

supplying second network interface access data of said second connection block descriptor to said network interface;

receiving second encoded data from said network interface in response to said second network interface access data supplying step; and decoding said second encoded data with second program decoding data of said second connection block descriptor to obtain said first broadband information.

5. A method as recited in claim 2, wherein at least one of said program identifiers corresponds to a control channel providing control data of a second information provider, the method further comprising the step of downloading said control data from said control channel into said second memory in response to a fourth user input.

6. A method as recited in claim 5, wherein said data of said at least one information provider and said control data of said second information provider are stored in first and second portions of said second memory, respectively.

7. A method as recited in claim 5, wherein said control data downloading step comprises the step of overwriting said second executable data from said at least one information provider stored in said second memory.

8. A method as recited in claim 7, wherein said control data downloading step further comprises the step of transmitting a session termination message corresponding to said suspended first portion to said broadband data network.

9. In a digital entertainment terminal adapted to receive broadband information from at least one information provider via a broadband data network, the digital entertainment terminal comprising a first memory for storing a first executable data enabling communication between the digital entertainment terminal and the broadband data network, a second memory for storing second executable data from the at least one information provider, and a user interface for receiving inputs from a user, a method for receiving the broadband data in response to user inputs, comprising the steps of:

executing a first portion of said second executable data from said at least one information provider and stored in said second memory in response to a first user input, wherein said executing step comprises the step of displaying a menu identifying available network services;

receiving first broadband information from said at least one information provider in response to said first portion executing step; and suspending said first portion executing step and executing said first executable data in response to a second user input;

further comprising the step of initiating a level 1 gateway session with the broadband data network in response to a third user input.

10. A method as recited in claim 9, further comprising the step of resuming said receiving step in response to a fourth user input, said resuming step comprising the steps of suspending said execution of said first executable data, and resuming execution of said first portion.

11. A method as recited in claim 9, further comprising the step of downloading control data of a second information provider identified from said menu into said second memory in response to a fifth user input.

12. A method as recited in claim 11, wherein said data of said at least one information provider and said control data of said second information provider are stored in first and second portions of said second memory, respectively.

13. A method as recited in claim 11, wherein said control data downloading step comprises the step of overwriting said second executable data from said at least one information provider stored in said second memory.

14. In a digital entertainment terminal adapted to receive broadband information from at least one information provider via a broadband data network, the digital entertainment terminal comprising a first memory for storing a first executable data enabling communication between the digital entertainment terminal and the broadband data network, a second memory for storing second executable data from the at least one information provider, and a user interface for receiving inputs from a user, a method for receiving the broadband data in response to user inputs, comprising the steps of:

executing a first portion of said second executable data from said at least one information provider and stored in said second memory in response to a first user input, receiving first broadband information from said at least one information provider in response to said first portion executing step;

suspending said first portion executing step and executing said first executable data in response to a second user input; and resuming said first broadband information receiving step in response to a third user input, said resuming step comprising the steps of suspending said execution of said first executable data, and resuming execution of said first portion;

wherein said resuming step comprises the steps of:

accessing a connection block descriptor stored in said first memory corresponding to said first broadband information, said connection block descriptor comprising network interface access data and program decoding data;

supplying said network interface access data to a network interface coupled to said digital entertainment terminal for communication with the broadband data network;

receiving encoded data from said network interface in response to said supplying step; and decoding said encoded data with said program decoding data to obtain said first broadband information.

15. In a digital entertainment terminal adapted to receive broadband information from at least one information provider via a broadband data network, the digital entertainment terminal comprising a first memory for storing a first executable data enabling communication between the digital entertainment terminal and the broadband data network, a second memory for storing second executable data from the at least one information provider, and a user interface for receiving inputs from a user, a method for receiving the broadband data in response to user inputs, comprising the steps of:

executing a first portion of said second executable data from said at least one information provider and stored in said second memory in response to a first user input;

receiving first broadband information from said at least one information provider in response to said first portion executing step; and suspending said first portion executing step and executing said first executable data in response to a second user input;

further comprising the steps of:

accessing a predetermined connection block descriptor stored in said first memory corresponding to a control channel on said network;

receiving at least a portion of a first application from said control channel in accordance with said predetermined connection block descriptor; and storing said received portion of said first application in said first memory.

16. A method as recited in claim 15, wherein said portion receiving step comprises the steps of downloading said portion into said second memory and transferring the downloaded portion from the second memory to the first memory.

17. In a digital entertainment terminal adapted to receive broadband information from at least one information provider via a broadband data network, the digital entertainment terminal comprising a first memory for storing a first executable data enabling communication between the digital entertainment terminal and the broadband data network, a second memory for storing second executable data from the at least one information provider, and a user interface for receiving inputs from a user, a method for receiving the broadband data in response to user inputs, comprising the steps of:

executing a first portion of said second executable data from said at least one information provider and stored in said second memory in response to a first user input;

receiving first broadband information from said at least one information provider in response to said first portion executing step; and suspending said first portion executing step and executing said first executable data in response to a second user input;

further comprising the steps of:
establishing an interactive session with said network in accordance with a default connection block descriptor; and
receiving at least a portion of a first application in response to said interactive session.

18. A method as recited in claim 17, wherein said portion receiving step comprises the step of loading said received portion of said first executable data into said first memory.

19. In a digital entertainment terminal adapted to receive broadband information from at least one information provider via a broadband data network, the digital entertainment terminal including a nonvolatile memory for storing a first executable data comprising a loader routine, an operating system, and a resident application for enabling communication between the digital entertainment terminal and the broadband data network, a dynamic random access memory (DRAM) for storing second executable data from the at least one information provider, and a user interface for receiving inputs from a user, a method for receiving the broadband data in response to user inputs, comprising the steps of:
executing a first portion of said second executable data from said at least one information provider and stored in said DRAM in response to a first user input;
receiving first broadband information from said at least one information provider in response to said first portion executing step; and
suspending said first portion executing step and executing said first executable data in response to a second user input,
wherein said digital entertainment terminal further comprises a DET processor, the method further comprising the steps of:
supplying a tuning command to a network interface coupled to said digital entertainment terminal, said network interface comprising an RF tuner and a terminal interface;
receiving from said terminal interface of said network interface to said DET processor an MPEG-encoded stream of data;
decoding said MPEG-encoded stream of data in said DET processor to obtain decoded data; and
loading said decoded data to one of said nonvolatile memory and DRAM as said first and second executable data, respectively.

20. A method as recited in claim 19, wherein said network interface further comprises a decryption processor, said MPEG-encoded stream of data being decrypted by said decryption processor.

21. In a digital entertainment terminal adapted to receive broadband information from at least one information provider via a broadband data network in accordance with a connection block descriptor assigned by said broadband data network, the digital entertainment terminal comprising a first memory storing a first application enabling communication between the digital entertainment terminal and the broadband data network, a second memory, and a remote receiver adapted to receive signals from a remote control unit, a method for selectively processing the received broadband data, comprising the steps of:
downloading data from the at least one information provider in accordance with a first corresponding connection block descriptor, stored in said first memory, into the second memory in response to a first command from the remote control unit;
executing a first portion of said downloaded data stored in said second memory;
receiving first broadband information from said at least one information provider in response to a second connection block descriptor accessed by the executed first portion of said downloaded data;
suspending said receiving step in response to a second command from the remote control unit; and
executing said first application stored in said first memory to receive second broadband data in response to a third connection block descriptor accessed by the executed first application.

22. A method as recited in claim 21, wherein said first portion stored in said second memory comprises navigation software.

23. A method as recited in claim 21, wherein said first portion stored in said second memory comprises interactive software.

24. A method as recited in claim 21, further comprising the step of resuming said first portion executing step and suspending said first application executing step, in response to a third command from the remote control unit.

25. A digital entertainment terminal comprising:
a user interface adapted to receive a terminal-specific input and an application-specific input;
a communication interface for receiving encoded streams of data from an interface to a digital broadband data network;
a first memory for storing a first application enabling communication between the digital entertainment terminal and the digital broadband data network;
a second memory for storing a second application enabling reception of provider services via said digital broadband data network, wherein said first memory comprises nonvolatile memory and said second memory comprises dynamic memory;
a processing unit for selectively executing said first application and said second application, in response to said application-specific input received by said user interface, to control reception and decoding of received encoded streams of data; and
an MPEG decoder for decoding said received encoded streams of data; wherein said processing unit outputs decoded data from said MPEG decoder to said first memory as a downloaded portion of said first application, and
wherein said downloaded portion of said first application comprises connection block descriptors identifying authorized program channels.

26. A terminal as recited in claim 25, wherein said processing unit further outputs decoded data from said MPEG decoder to said second memory as a downloaded portion of said second application.

27. A network for transporting broadcast and interactive signals to a plurality of subscribers, comprising:
a broadcast provider interface for receiving a plurality of broadcast signals from a plurality of broadcast information providers and outputting multiplexed broadcast signals;
an access subnetwork receiving said multiplexed broadcast signals and said interactive signals for the corresponding subscribers requesting said interactive signals and outputting a combined data signal, said access subnetwork assigning at least one bandwidth portion of said combined data signal to each of said subscribers in response to a corresponding session request signal;

a backbone subnetwork for routing signaling data and said interactive signals between said information providers and said access subnetwork serving said subscribers requesting said interactive signals, said backbone subnetwork supplying said interactive signals to said subscribers through assigned bandwidth in the access subnetwork in response to said session request signals; and a local distribution network for supplying said combined data signal to said subscribers, each of said subscribers having digital terminals for selectively receiving said broadcast and interactive signals from said combined data signal in accordance with first and second applications executed in said digital terminal in response to a selection input.

28. A network as recited in claim 27, further comprising a control subnetwork for requesting said access subnetwork to assign said at least one bandwidth portion in response to said session request signal, said control subnetwork outputting a connection block descriptor to said subscribers for each of said interactive signals, each of said at least one bandwidth portion being identified by said corresponding digital terminal by said corresponding connection block descriptor.

29. A network as recited in claim 28, wherein at least one of said subscribers simultaneously receives more than one of said interactive signals, the digital terminal corresponding to said at least one subscriber selectively decoding said more than one interactive signals in response to said selection input by said subscriber.

* * * * *